US007093026B2

(12) United States Patent
Kokado et al.

(10) Patent No.: US 7,093,026 B2
(45) Date of Patent: Aug. 15, 2006

(54) DATA TRANSMISSION SYSTEM

(75) Inventors: Takeshi Kokado, Kyotanabe (JP); Hiroshi Yokota, Suita (JP)

(73) Assignee: Matsushita Electric Industrial, Co. LTD, Osaka (JP)

( * ) Notice: Subject to any disclaimer, the term of this patent is extended or adjusted under 35 U.S.C. 154(b) by 703 days.

(21) Appl. No.: 09/781,153

(22) Filed: Feb. 13, 2001

(65) Prior Publication Data
US 2001/0018713 A1    Aug. 30, 2001

(30) Foreign Application Priority Data
Feb. 14, 2000   (JP)   ............................ 2000-034688

(51) Int. Cl.
*G06F 15/173*   (2006.01)
(52) U.S. Cl. ...................... 709/239; 709/238; 709/227; 709/228; 709/232
(58) Field of Classification Search ................ 709/223, 709/235, 217, 219, 226, 229, 239, 238, 227, 709/228, 232; 705/44; 395/200; 370/61
See application file for complete search history.

(56) References Cited

U.S. PATENT DOCUMENTS

| 5,920,701 | A | * | 7/1999 | Miller et al. | 709/228 |
| 5,987,840 | A | * | 11/1999 | Leppert | 52/592.6 |
| 6,134,584 | A |   | 10/2000 | Chang et al. |  |
| 6,151,357 | A | * | 11/2000 | Jawahar et al. | 375/228 |
| 6,182,122 | B1 | * | 1/2001 | Berstis | 709/217 |
| 6,263,201 | B1 | * | 7/2001 | Hashimoto et al. | 455/403 |
| 6,272,132 | B1 | * | 8/2001 | Ofek et al. | 370/389 |
| 6,418,467 | B1 | * | 7/2002 | Schweitzer et al. | 709/223 |
| 6,546,488 | B1 | * | 4/2003 | Dillon et al. | 713/181 |
| 6,581,105 | B1 | * | 6/2003 | Miloslavsky et al. | 709/238 |
| 6,587,438 | B1 | * | 7/2003 | Brendel | 370/238 |

(Continued)

FOREIGN PATENT DOCUMENTS
JP    6-153198    5/1994

(Continued)

OTHER PUBLICATIONS

"A Multiple Access Control Protocol for an Interactive Multimedia Network", Himonas S D et al., communications: The key to global prosperity. Global telecommunications conference, New York, IEEE, US, vol. 1, Nov. 18, 1996.

(Continued)

*Primary Examiner*—John Follansbee
*Assistant Examiner*—Mohammad Siddiqi
(74) *Attorney, Agent, or Firm*—Wenderoth, Lind & Ponack, L.L.P.

(57) ABSTRACT

A content server transmits content data designated by a content reservation request from a DTE onto a first or a second communications circuit for storage into a DCE connected to the DTE. The content reservation request indicates a time limit in which the designated content data is to be ready in the DCE. The content server manages the designated time limit, and performs scheduling processing. During the processing, based on both the managed time limit and predetermined communications information, a transmission timing is determined which ensures that the content data is completely transmitted by the time limit, and which communications circuit is optimal. The content server transmits the content data onto the determined optimal communications circuit within the determined transmission timing. Accordingly, the data transmission system can achieve an efficient use of a communications circuit in terms of transmission bandwidth, and download data from a server at a lesser expense.

34 Claims, 29 Drawing Sheets

U.S. PATENT DOCUMENTS 6,611,812 B1 * 8/2003 Hurtado et al. ............... 705/26
6,862,622 B1 * 3/2005 Jorgensen ................... 709/226

FOREIGN PATENT DOCUMENTS

| JP | 7-111648 | 4/1995 |
| JP | 8-140081 | 5/1996 |
| JP | 10-41976 | 2/1998 |
| JP | 11-275549 | 10/1999 |
| JP | 11-341371 | 12/1999 |

OTHER PUBLICATIONS

"Keine Onlinewartezeiten mehr beim Downloaden im Internet". N.N. Downloadslave, Jun. 1998.

* cited by examiner

FIG. 5

| ADDRESSEE LIST $L_{DEST}$ | | | | | | |
|---|---|---|---|---|---|---|
| DL CONDITION NUMBER $N_{DL}$ | IDENTIFIER $ID_{CD}$ | TIME LIMIT LT | TRANSMISSION EXPENSE TC | IDENTIFIER $ID_{USER}$ | TRANSMISSION COMMUNICATIONS CIRCUIT FLAG $F_{CIR}$ | |
| 1 | β1 | FEBRUARY 17 18:00 | ¥450 | α2 – α500 (499 IDENTIFIERS $ID_{USER}$ IN TOTAL) | | } UR11 |
| 2 | β1 | FEBRUARY 16 20:00 | ¥480 | α6 • • | | } UR12 |
| 3 | β1 | FEBRUARY 14 19:00 | ¥530 | α10 • • | | } UR13 |

65 ADDRESSEE LIST STORAGE

UR1 { UR11, UR12, UR13 }

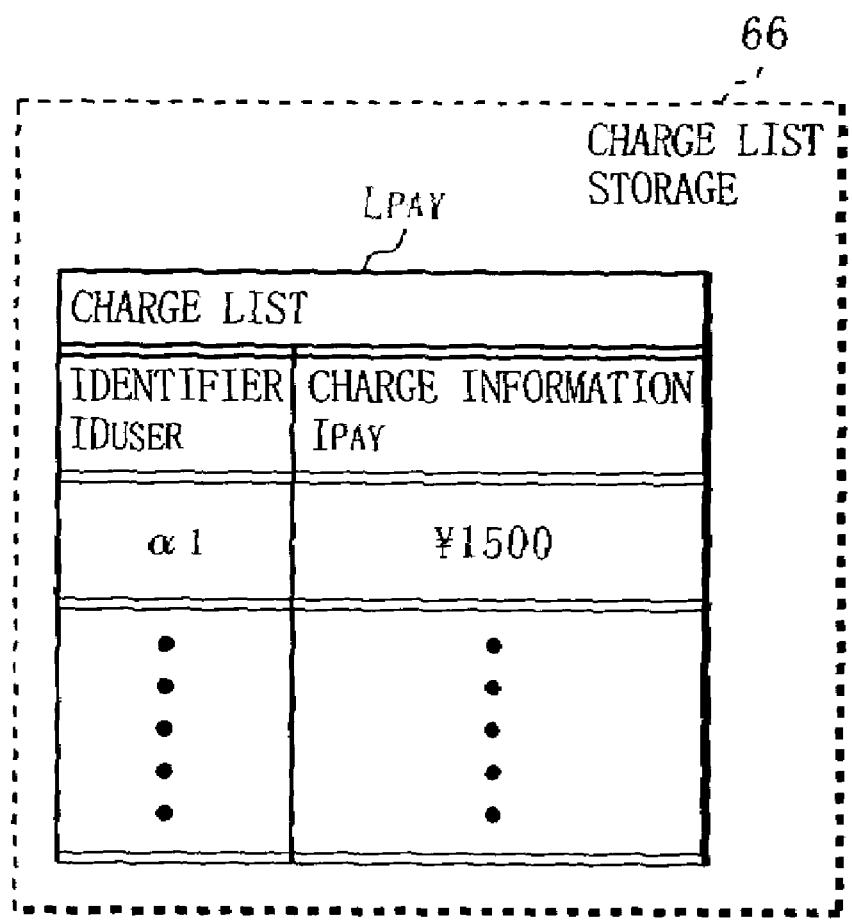

FIG. 7

TRANSMISSION EXPENSE LIST STORAGE 67

$L_{TC}$

| TRANSMISSION EXPENSE LIST | |
|---|---|
| THE NUMBER OF USERS $N_{USER}$ | TRANSMISSION EXPENSE TC |
| $500 \leq N_{USER5}$ | $TC_5 = (¥400)$ |
| $100 \leq N_{USER4} < 500$ | $TC_4 = (¥450)$ |
| $50 \leq N_{USER3} < 100$ | $TC_3 = (¥480)$ |
| $20 \leq N_{USER2} < 50$ | $TC_2 = (¥530)$ |
| $N_{USER1} < 20$ | $TC_1 = (¥550)$ |

FIG. 8

TRANSMISSION INITIAL EXPENSE LIST STORAGE 68

$L_{ITC}$

| TRANSMISSION INITIAL EXPENSE LIST | |
|---|---|
| TIME MARGIN TM | TRANSMISSION INITIAL EXPENSE ITC |
| $168 \leq TM_5$ | $ITC_5 = (¥400)$ |
| $72 \leq TM_4 < 168$ | $ITC_4 = (¥450)$ |
| $24 \leq TM_3 < 72$ | $ITC_3 = (¥480)$ |
| $12 \leq TM_2 < 24$ | $ITC_2 = (¥530)$ |
| $TM_1 < 12$ | $ITC_1 = (¥550)$ |

FIG. 16a

| DL CONDITION NUMBER N_DL | IDENTIFIER ID_CD | TIME LIMIT LT | TRANSMISSION EXPENSE TC | IDENTIFIER ID_USER | COMMUNICATIONS CIRCUIT FLAG F_CIR |
|---|---|---|---|---|---|
| 1 | β1 | FEBRUARY 17 18:00 | ¥450 | α2- α500 499 IDENTIFIERS ID_USER IN TOTAL | |

FIG. 16b

| DL CONDITION NUMBER N_DL | IDENTIFIER ID_CD | TIME LIMIT LT | TRANSMISSION EXPENSE TC | IDENTIFIER ID_USER | COMMUNICATIONS CIRCUIT FLAG F_CIR |
|---|---|---|---|---|---|
| 1 | β1 | FEBRUARY 17 18:00 | ¥400 | α1- α500 500 IDENTIFIERS ID_USER IN TOTAL | |

FIG. 16c

| DL CONDITION NUMBER N_DL | IDENTIFIER ID_CD | TIME LIMIT LT | TRANSMISSION EXPENSE TC | IDENTIFIER ID_USER | COMMUNICATIONS CIRCUIT FLAG F_CIR |
|---|---|---|---|---|---|
| 4 | β1 | FEBRUARY 15 20:00 | ¥480 | α1 | |

FIG. 19a

| DL CONDITION NUMBER NDL | IDENTIFIER IDCD | TIME LIMIT LT | TRANSMISSION EXPENSE TC | IDENTIFIER IDUSER | COMMUNICATIONS CIRCUIT FLAG FCIR |
|---|---|---|---|---|---|
| 1 | β1 | FEBRUARY 17 18:00 | ¥400 | α1-α500 (500 IDENTIFIERS IDUSER IN TOTAL) | 0 |

| DL CONDITION NUMBER NDL | IDENTIFIER IDCD | TIME LIMIT LT | TRANSMISSION EXPENSE TC | IDENTIFIER IDUSER | COMMUNICATIONS CIRCUIT FLAG FCIR |
|---|---|---|---|---|---|
| 2 | β1 | FEBRUARY 16 20:00 | ¥480 | α6 ⋮ | 1 |

UR12

F I G. 27a

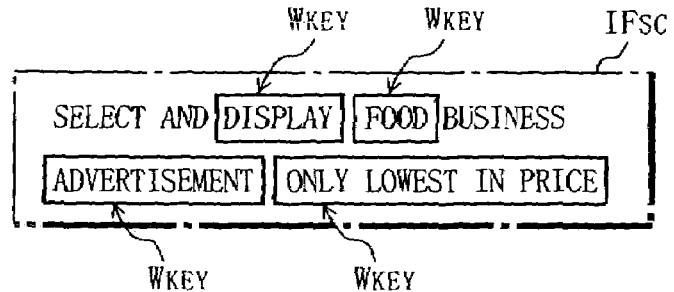

F I G. 27b

| SELECTION CONDITION LIST STORAGE |  |
|---|---|
| SELECTION CONDITION LIST |  |
| SELECTION CONDITION NUMBER NSC | SELECTION CONDITION SC |
| SELECTION CONDITION No. 1 | SELECT FOOD BUSINESS ADVERTISEMENT ONLY LOWEST IN PRICE |
| SELECTION CONDITION No. 2 | NOT SELECT REAL-ESTATE BUSINESS ADVERTISEMENT |
| SELECTION CONDITION No. 3 | SELECT ALL ELECTRIC APPLIANCES ADVERTISEMENT |
| SELECTION CONDITION No. 4 | NOT SELECT ENTERTAINMENT NEWS |
| SELECTION CONDITION No. 5 | SELECT ALL NEWS, ENTERTAINMENT EXCLUSIVE |

DATA TRANSMISSION SYSTEM

BACKGROUND OF THE INVENTION

1. Field of the Invention

The present invention relates to data transmission systems and, more specifically, to a data transmission system for transmitting data from a server to a data circuit terminating equipment that is connected to a data terminal equipment. Here, the data that is transmitted from the server is the data that is reserved by the data terminal equipment.

2. Description of the Background Art

There have been proposed various data transmission systems which are of a type as described above. An example is the data transmission system disclosed in Japanese Patent Laid-Open Publication No. 8-140081 (96-140081), which includes a device in an information source (hereinafter, referred to as server), and an information storage unit which receives the information on the user's side. The server and the information storage unit are connected to each other over a network. The server waits for users' requests for data transmission until a data distribution time which has been set under a predetermined manner. Even if one request comes, the server waits for other requests for the transmission of the same data for the set time period. When the data distribution time comes, the server sends the requested data onto a communications circuit. Then, the information storage unit on the user's side receives and stores the data therein. Accordingly, in such a conventional data transmission system, the server can selectively perform data transmission in a time period when, before the data distribution time, the communications circuit is not congested. In this manner, the communications circuit can be efficiently utilized.

The issue here is that the communications circuit varies in characteristics depending on its type. As an example, a wired public circuit typified by ISDN is not suited for multicasting. This is because any transmission bandwidth of a number of data channels in the public circuit is occupied by multicasting, thereby simultaneously transmitting the same data to many users using the public communications circuit. Unlike the wired public circuit, a satellite circuit may be a possibility for multicasting since data transmission is performed through the shared use of a transmission bandwidth. However, the conventional data transmission system still bears a problem of not efficiently utilizing the transmission bandwidth of the communications circuit since data is unconditionally sent out to the same communications circuit regardless of the number of users receiving the data. Here, assume that the data transmission system only has a wired public circuit. In such a case, a server in the system has to transmit data through the wired public circuit regardless of whether multicasting is preferable, which results in a waste of transmission bandwidth.

The conventional data transmission system bears another problem regarding a communications expense. In a case where a user wants to download relatively large data such as moving pictures, the communications expense therefor is high.

SUMMARY OF THE INVENTION

Therefore, an object of the present invention is to provide a data transmission system which achieves an efficient use of a communications circuit in terms of transmission bandwidth, and data download from a server at a lesser expense.

The present invention has the following features to attain the object described above.

A first aspect of the present invention is directed to a data transmission system in which a server sends out, onto any one of a plurality of communications circuits, content data that is designated by a content reservation request to a data circuit terminating equipment connected to a data terminal equipment for storage.

The content reservation request additionally indicates a time limit in which the content data that is designated by the data terminal equipment is to be ready in the data circuit terminating equipment.

Either the server or any one of the communications circuits of the first aspect a time limit management part for managing the time limit that is designated by the content reservation request from the data terminal equipment; and a scheduling part for determining, based on both the time limit that is managed in the time limit management part and predetermined communications information, a transmission timing which ensures that the content data completely transmitted by the time limit and an optimal communications circuit from among the plurality communications circuits.

Further, the server comprises a data send out part for sending out the content data onto the optimal communications circuit according to the transmission timing that is determined by the scheduling part.

A second aspect of the present invention is directed to a data transmission system in which content data that is designated by a content reservation request is transmitted from a server to a data terminal equipment through a communications circuit.

The content reservation request additionally indicates a download condition for downloading the content data that is designated by the data terminal equipment.

The data transmission system of the second aspect comprises a content reservation status data generation part for generating content reservation status data indicating the download condition for the content data based on the received content reservation request. The data transmission system of the second aspect also comprises a data transmission part for transmitting the content reservation status data that is generated by the content reservation status data generation part to the data terminal equipment.

By comprising the content reservation status data generation part and the data transmission part, the transmission system induces other data terminal equipment by showing that the content data is available under the download condition.

The data transmission system of the second aspect further comprises: a DL condition management part for managing the content data and the download condition that is designated (indicated) by the content reservation request from the data terminal equipment; a scheduling part for determining, based on the download condition managed in the DL condition management part, a transmission timing which ensures that the content data is transmitted under the download condition; and a data send out part for sending out the content data onto the communications circuit according to the transmission timing that is determined by the scheduling part.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a schematic diagram of an addressee list $L_{DEST}$ which is stored in an addressee list storage 65 of FIG. 3;

FIG. 6 is a schematic diagram of a charge list $L_{PAY}$ which is stored in a charge list storage 66 of FIG. 3;

FIG. 7 is a schematic diagram of a transmission expense list $L_{TC}$ which is stored in a transmission expense list storage 67 of FIG. 3;

FIG. 8 is a schematic diagram of a transmission initial expense list $L_{ITC}$ which is stored in a transmission initial expense list storage 68 of FIG. 3;

FIGS. 16a to 16c are diagrams each showing a unit record $UR_1$ which is updated or newly-generated in step ST8 of FIG. 15;

FIGS. 19a and 19b are diagrams for demonstrating a communications circuit flag $F_{CIR}$ that is set by the processing of FIG. 18;

FIGS. 27a and 27b are diagrams demonstrating a selection condition list $L_{SC}$ which is stored in a selection condition list storage 36 of FIG. 24;

DETAILED DESCRIPTION OF THE INVENTION

First Embodiment

Figure 1:
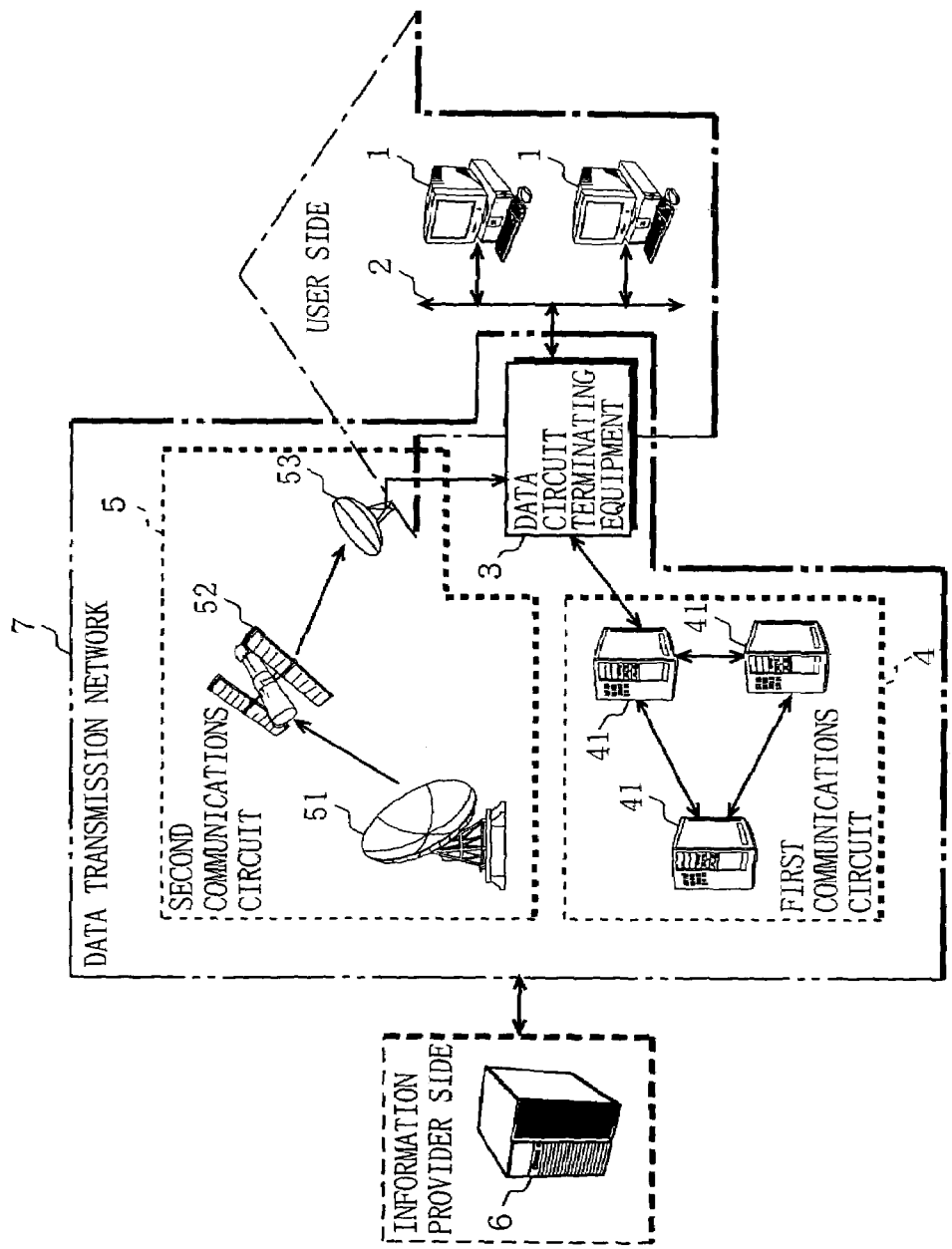
FIG. 1 is a diagram showing the entire configuration of a data transmission system according to a first embodiment of the present invention.

FIG. 1 is a diagram showing the entire configuration of a data transmission system according to a first embodiment of the present invention. In FIG. 1, the data transmission system includes a data terminal equipment (hereinafter, referred to as DTE, two DTEs are illustrated herein) 1, a wired or wireless transmission path 2, a data circuit terminating equipment (hereinafter, referred to as DCE) 3, a first and a second communications circuit 4 and 5 which are exemplified herein as a plurality of communications circuits, and a content server (hereinafter, simply referred to as server) 6.

The DTE 1 is operable by a user as is a personal computer, and carries out output processing on a content data CD (see FIG. 4) that is downloaded from the server 6 so as to output to the user what the content data CD presents. The DTE 1 is connected to the DCE 3 through the transmission path 2 for bidirectional data communications therebetween.

Figure 2:
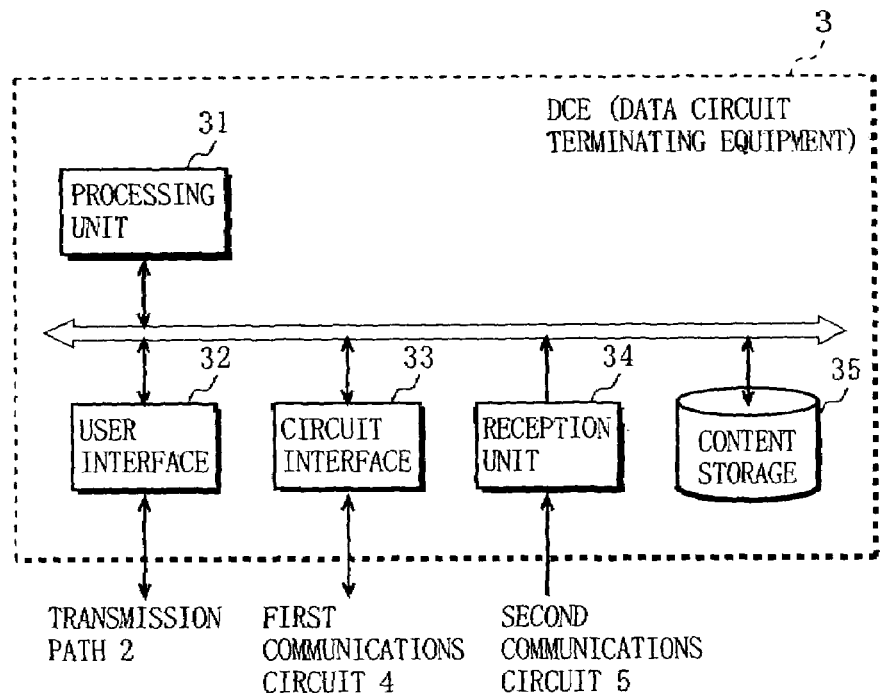
FIG. 2 is a block diagram showing the configuration of a data circuit terminating equipment (DCE) 3 of FIG. 1.

The DCE 3 is connected to at least one exchange system 41 (as will be described later), and performs bidirectional data communications with the server 6 through the first communications circuit 4. In the DCE 3, power is supplied for operation, preferably, from the first communications circuit 4, which is wired. The DCE 3 is also connected to a reception antenna 53 (as will be described below), and receives data from the server 6 through the second communications circuit 5. The DCE 3 includes, as shown in FIG. 2, a processing unit 31, a user interface 32, a circuit interface 33, a reception unit 34, and a content storage 35.

The DTE 1 and DCE 3 are placed on the user's side (typically in the user's house) as shown in FIG. 1. Here, the DTE 1 may be plurally provided. FIG. 1 shows a set thereof only for one user for convenience, but the actual data transmission system of the first embodiment includes many sets of equipment, which are at least one DTE 1 and the DCE 3, on the user side. Each of the equipment that is provided on the user's side is assigned, in advance, a unique identifier $ID_{USER}$ for user identification. In the first embodiment, the identifier $ID_{USER}$ that is assigned to the set of the DTEs 1 and the DCE 3 of FIG. 1 is presumably $\alpha_1$.

The first communications circuit 4 is a wired public circuit having several exchange systems 41 provided therein. These exchange systems 41 are connected to one another via a communications line that is typified by an optical fiber cable, a twisted pair wire, and/or a coaxial cable. The first communications circuit 4 is suited for transmitting each different content data CD to many DTEs 1 due to the exchange systems 41 each performing routing. However, the first communications circuit 4 is not suited for multicasting. This is because if the server 6 simultaneously distributes the same content data CD to many DTEs 1 over the first communications circuit 4, any transmission bandwidth of a number of data channels is occupied by data distribution.

The second communications circuit 5 includes, in the first embodiment, a transmission antenna 51, and a satellite circuit including an artificial satellite 52 and the reception antenna 53. Unlike the first communications circuit 4, however, the second communications circuit 5 is suitable for multicasting and allows a shared use of a bandwidth for the transmission of the same content data CD to many DTEs 1. However, the second communications circuit 5 is not good for transmitting each different content data CD to many DTEs 1 as the transmission bandwidth of the second communication circuit 5 is sharable by all of the plurality of DTEs 1. If various content data CDs are sent out onto the second communications circuit 5, it will soon be short of the transmission bandwidth. Here, as shown in FIG. 1, the DCE 3, and the first and second communications circuits 4 and 5 configure a data transmission network 7.

Figure 3:
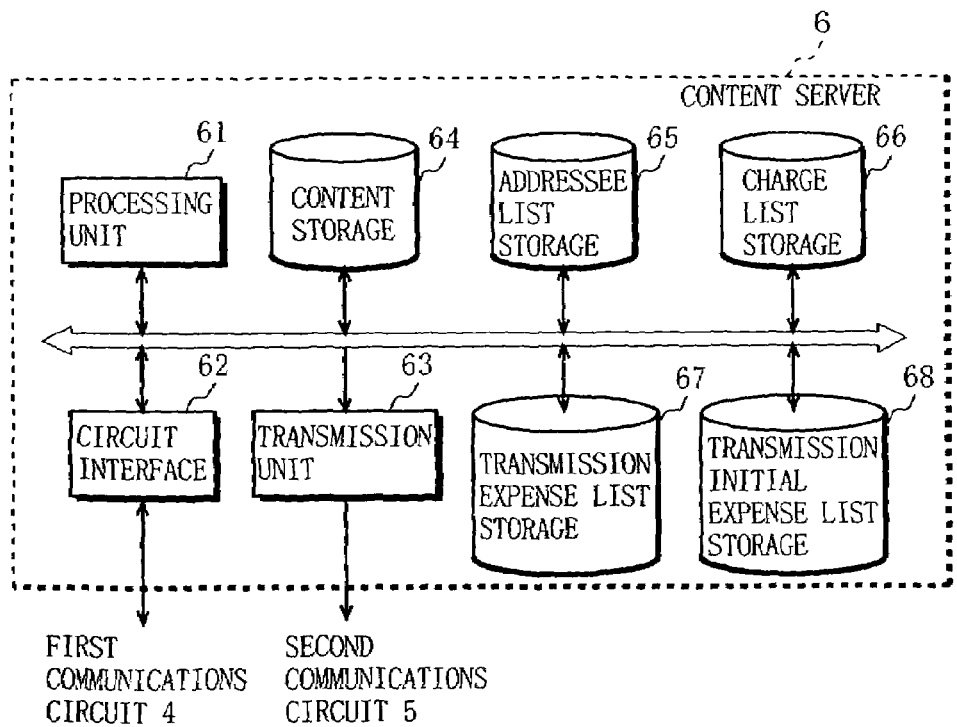
FIG. 3 is a block diagram showing the configuration of a content server 6 of FIG. 1.

The server 6 is placed on the information provider's side from where the content data CD is distributed to the users', side and is previously assigned a unique identifier $ID_{SERVER}$ for server identification. The server 6 is connected to at least one exchange system 41, and performs bidirectional data communications with the DCE 3 through the first communications circuit 4. The server 6 is also connected to the transmission antenna 51, and transmits data to the DTE 1 over the second transmission circuit 5. As shown in FIG. 3, the server 6 includes a processing unit 61, a circuit interface 62, a transmission unit 63, a content storage 64, an addressee list storage 65, a charge list storage 66, a transmission expense list storage 67, and a transmission initial expense list storage 68.

Figure 4:
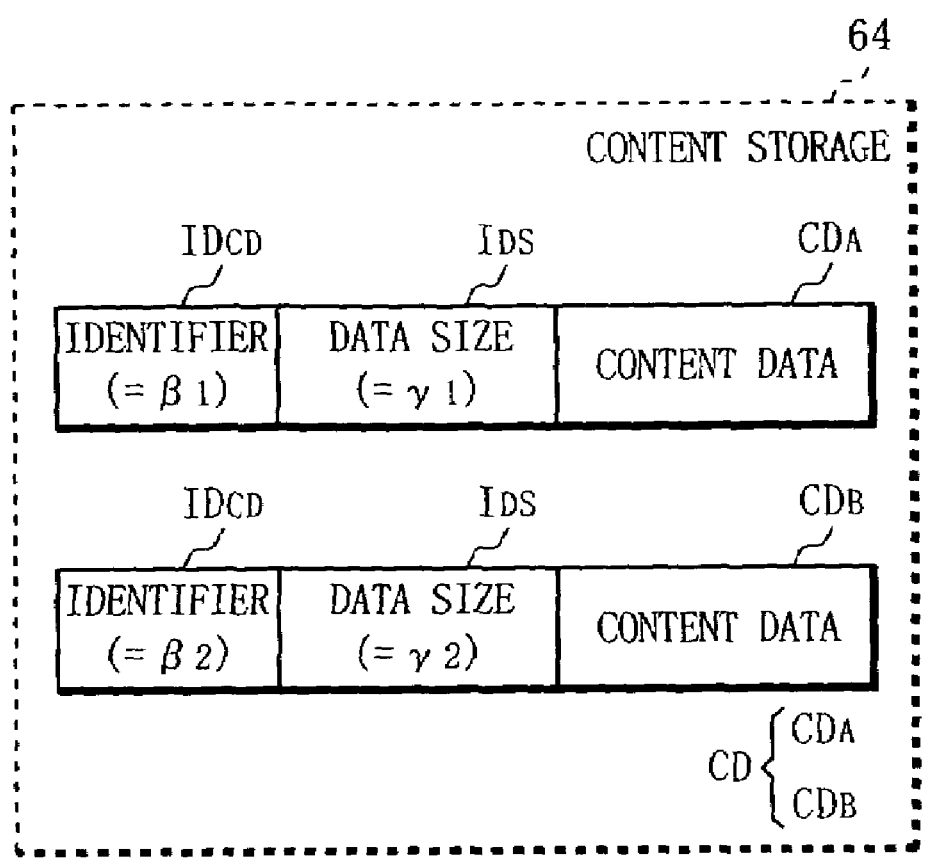
FIG. 4 is a diagram showing the configuration of a content data CD which is stored in a content storage 64 of FIG. 3.

As shown in FIG. 4, the content storage 64 stores several types of content data CDs. The content data CD is typically moving picture data, static picture data, audio data, object data, character data, or a combination of two or more of such data. Also, the content data CD is provided with at least an identifier $ID_{CD}$ and a data size $I_{DS}$. The identifier $ID_{CD}$ uniquely specifies a recording location where the content data CD is stored in the content storage 64. The data size $I_{DS}$ shows the content data CD by size. In the first embodiment, as shown by the accompanying drawings, content data $CD_A$ and $CD_B$ are stored in the content storage 64. Here, presumably, the content data $CD_A$ is provided with $\beta_1$ for the identifier $ID_{CD}$ and $\gamma_1$ for the data size $I_{DS}$, while the content data $CD_B$ is provided with $\beta_2$ and $\gamma_2$ for the identifier $ID_{CD}$ and the data size $I_{DS}$, respectively.

The addressee list storage 65 corresponds to a time limit management part and a DL condition management part herein, and stores an addressee list $L_{DEST}$ therein. As shown in FIG. 5, the addressee list $L_{DEST}$ is composed of several unit records $UR_1$, which are exemplarily described herein as $UR_{11}$ to $UR_{13}$. Each unit record $UR_1$ indicates what the conditions are for downloading the content data CD therein. Specifically, included in each of the unit records $UR_1$ are a download condition number (hereinafter, referred to as DL condition number) $N_{DL}$, an identifier $ID_{CD}$, a time limit LT, a transmission expense TC, at least one identifier $ID_{USER}$, and a communications circuit flag $F_{CIR}$. Herein, the DL condition number $N_{DL}$ uniquely specifies the unit record $UR_1$, and the identifier $ID_{CD}$ specifies which content data CD corresponds to a user's request for data transmission. The time limit LT is a user designated time for the content data CD at the user's request to be ready in the content storage 35 of the DCE 3. The identifier $ID_{USER}$ shows, specifically in the addressee list $L_{DEST}$, the DCE 3 which receives the content data CD. The transmission expense TC indicates how much the user is to be charged for the content data CD that is transmitted from the server 6 to the DCE 3. The communications circuit flag $F_{CIR}$ indicates which of the communications circuits 4 or 5 is to be used for the transmission of the content data CD. In the first embodiment, presumably, a value of 1 for the communications circuit flag $F_{CIR}$ indicates the first communications circuit 4, while a value of 0 for the communication circuit flag $F_{CIR}$ indicates the second communications circuit 5 (refer to FIGS. 19a and 19b).

In this example of FIG. 5, specifically, the unit record $UR_{11}$ shows $\beta_1$ for the identifier $ID_{CD}$, 18:00 on February 17 for the time limit LT, and $\alpha_2$ to $\alpha_{500}$ for the identifier $ID_{USER}$. Here, $\alpha_2$ to $\alpha_{500}$ mean 499 sets of equipment, which are exclusive of the set $\alpha_1$ in FIG. 1. Accordingly, the content data $CD_A$ is transmitted, by 18:00 on February 17, to 499 DCEs 3 that are specified by the identifier $ID_{USER}$. Further, the unit record $UR_{11}$ shows ¥450 for the transmission expense TC, which means the current transmission expense of the content data $CD_A$ for those 499 DCEs is ¥450. Here, the unit records $UR_{12}$ and $UR_{13}$ are not described as they are similar to the unit record $UR_{11}$. Note that the unit records $UR_1$ which are exemplified herein show only the identifier $ID_{CD}$ of $\beta_1$, which means that no user is requesting for the transmission of the content data $CD_B$.

The charge list storage 66 stores a charge list $L_{PAY}$. As shown in FIG. 6, the charge list $L_{PAY}$ is composed of charge information $I_{PAY}$ for every identifier $ID_{USER}$. The charge information $I_{PAY}$ indicates how much a user that is specified by the corresponding identifier $ID_{USER}$ needs to pay, in total, for the content data CD(s) that the user downloaded in a predetermined time period. Note herein that, for easy understanding, the charge information $I_{PAY}$ presumably indicates the total amount of the transmission expense TC. This is not restrictive, and other types of expenses (i.e., a copyright fee) may be included therein.

The charge list $L_{PAY}$ in FIG. 6 exemplifies a case where the identifier $ID_{USER}$ is $\alpha_1$, and the charge information $I_{PAY}$ therefor is ¥1,500. Cases for other identifier $ID_{USER}$ are not described here for the sake of convenience.

The transmission expense list storage 67 stores a transmission expense list $L_{TC}$. As shown in FIG. 7, the transmission expense list $L_{TC}$ indicates that the transmission expense TC varies with the number of users $N_{USER}$ that request data transmission. In the first embodiment, the number of users $N_{USER}$ is put into 5 classes of $N_{USER1}$ to $N_{USER5}$, depending on the number of users. As an example, the number of users $N_{USER1}$ covers a range of 1 to 19 users, and the transmission expense TC therefor is fixed at ¥550. FIG. 7 illustrates an example the respective transmission expenses TC for other classes of the number of users $N_{USER2}$ to $N_{USER5}$.

The transmission initial expense list storage 68 stores a transmission initial list $L_{ITC}$, which shows the transmission expense TC in its initial value. As shown in FIG. 8, the transmission initial expense list $L_{ITC}$ shows that the transmission initial expense varies with a time margin TM, which is a length of time that is measured from the server 6 receiving a user's content reservation request $RS_{TR}$ to the time limit LT designated thereby. In the first embodiment, the time margin TM is put into 5 classes of $TM_1$ to $TM_5$, depending on the amount of the time margin TM. For example, the time margin $TM_1$ covers a range of 0 to 12 (hour), and the transmission initial expense $ITC_1$ therefor is fixed at ¥550. FIG. 8 illustrates an example of the respective transmission initial expenses ITC for other classes of the time margins $TM_2$ to $TM_5$.

Figure 9:
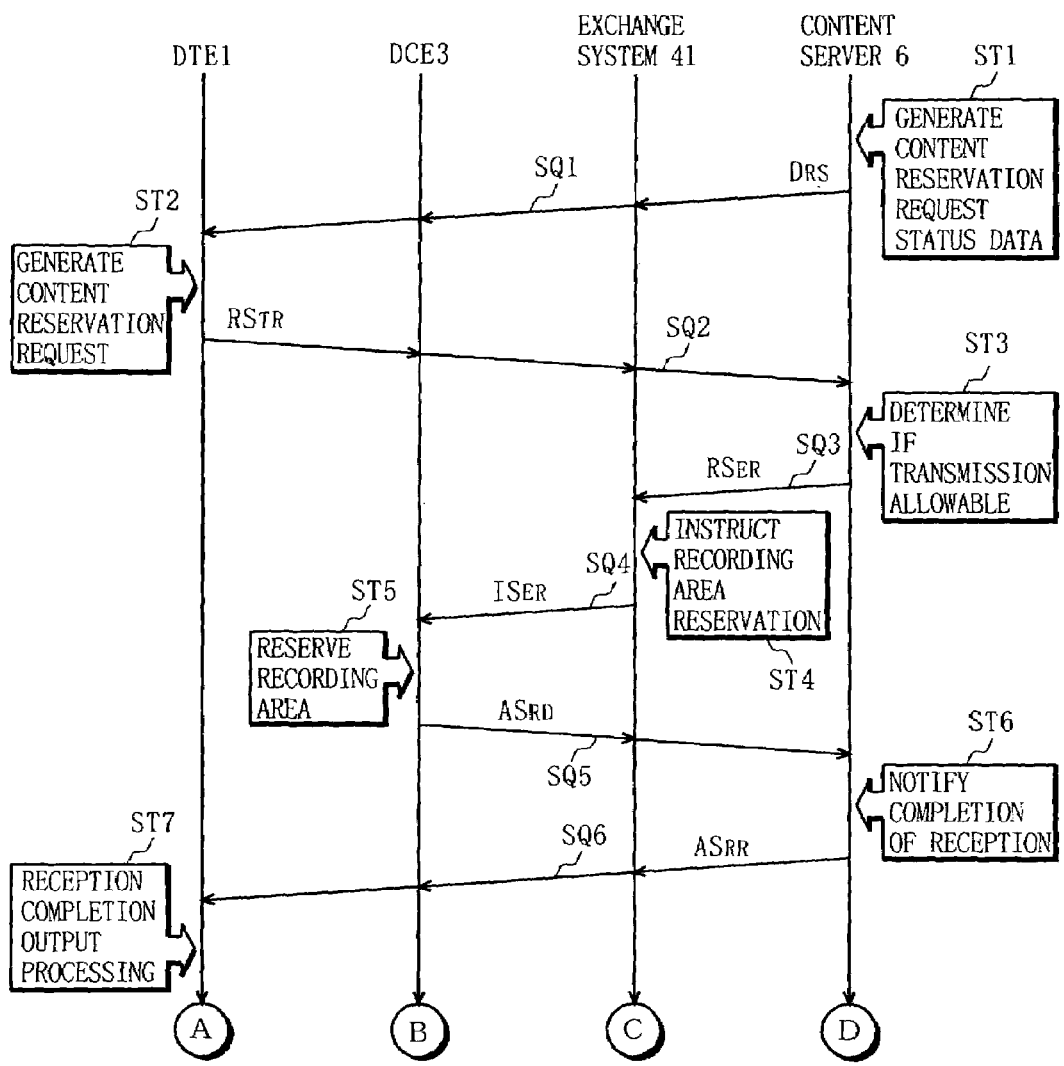
FIG. 9 is a first half of a sequence chart showing a communications procedure in the data transmission system of FIG. 1.
Figure 10:
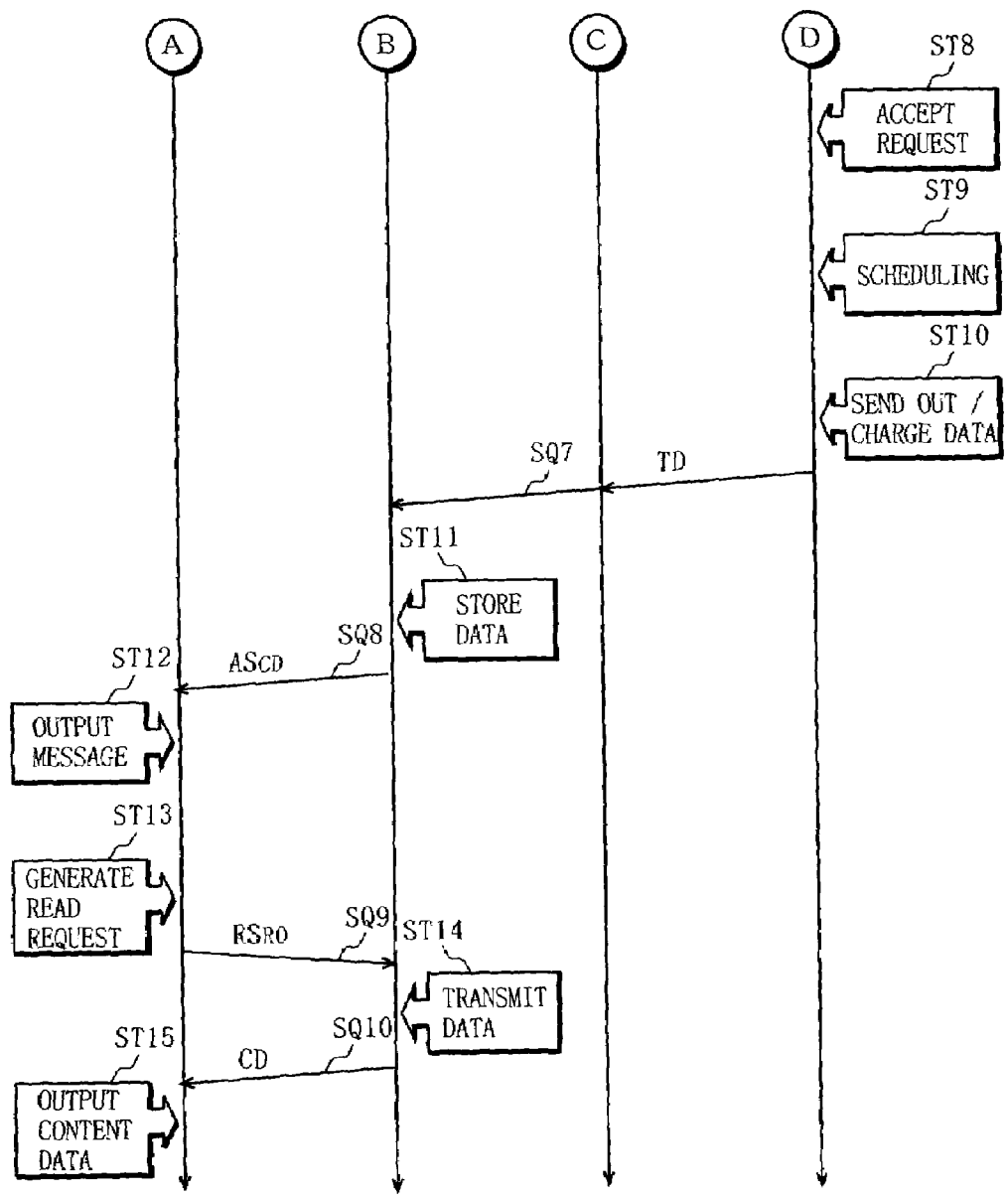
FIG. 10 is a second half of the sequence chart showing the communications procedure in the data transmission system of FIG. 1.
Figure 11:
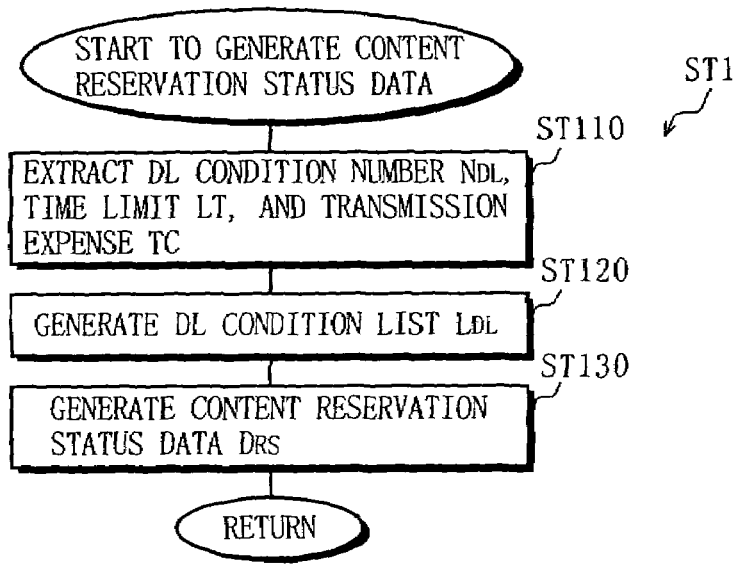
FIG. 11 is a flowchart showing step ST1 of FIG. 9 in more detail for its processing procedure.

Described next with reference to the sequence charts of FIGS. 9 and 10 is the communications procedure for the DTE 1 to retrieve a content data CD in the above-structured data transmission system. First, in FIG. 9, in response to a request coming from the DTE 1 (not shown), the server 6 generates content reservation status data $D_{RS}$ based on an addressee list $L_{DEST}$ that is currently stored (step ST1). Step ST1 corresponds to a content reservation status data generation part herein, and FIG. 11 shows the processing procedure thereof in detail. In FIG. 11, the processing unit 61 of the server 6 extracts, from each unit record $UR_1$ that is found in the addressee list $L_{DEST}$ (see FIG. 5), a DL condition number $N_{DL}$, a time limit LT, and a transmission expense TC (step ST110). Next, the processing unit 61 generates a download condition list (hereinafter, referred to as a DL condition list) $L_{DL}$ for every extracted set of the DL condition number $N_{DL}$, the time limit LT, and the transmission expense TC (step ST120). The DL condition list specifies what are the conditions for downloading any content data CD.

Figure 12:
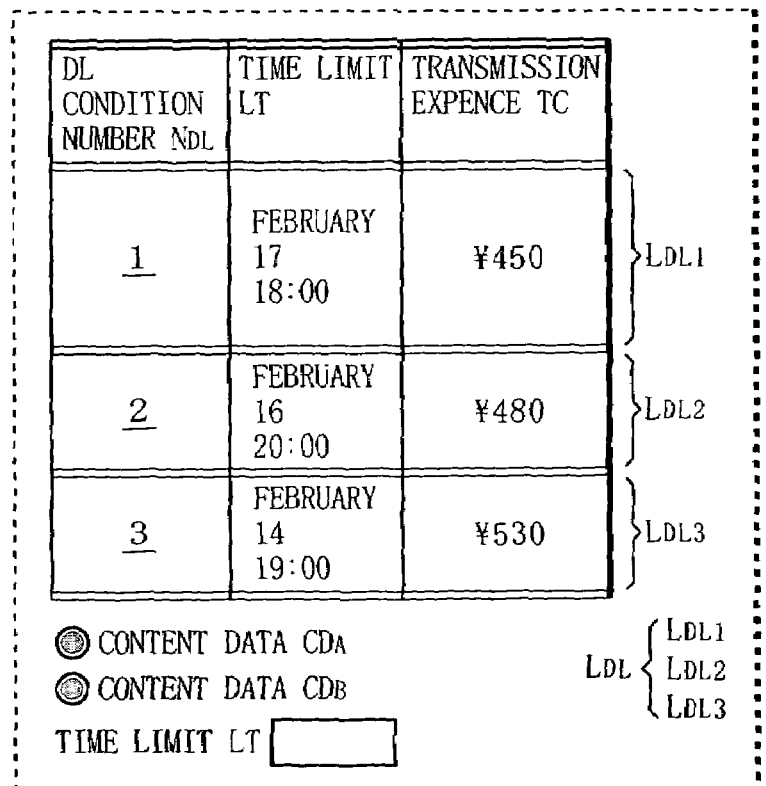
FIG. 12 is a diagram for demonstrating the contents of content reservation status data $D_{RS}$ of FIG. 9.

After step ST120, the processing unit 61 generates content reservation status data $D_{RS}$ (step ST130). As shown in FIG. 12, the content reservation status data $D_{RS}$ represents each DL condition list $L_{DL}$ that is generated in step S120 and displayed on the side of DTE 1. With this DL condition list $L_{DL}$, the user can easily find the DL condition list $L_{DL}$ that best meets his/her needs. Here, the content reservation status data $D_{RS}$ is generated in such a manner that the DTE 1 can generate a content reservation request $RS_{TR}$, which will be described later, in response to the user's designation of the DL condition number $N_{DL}$. Preparing for a case where the user does not find a DL condition list $L_{DL}$ matching his/her needs, the content reservation status data $D_{RS}$ is structured so that the user himself/herself can designate the content data CD and the time limit LT by operating the DTE 1. This is the end of the processing of step ST1.

Here, assume that the processing unit 61 generates such content reservation status data $D_{RS}$ based on the unit records $UR_{11}$ to $UR_{13}$ shown in FIG. 5. In this case, after the DTE 1 executes display processing on the content reservation status data $D_{RS}$, three DL condition lists $L_{DL1}$ to $L_{DL3}$ as shown in FIG. 12 are displayed on a screen of the DTE 1. Here, the DL condition list $L_{DL1}$ for the content data $CD_A$ indicates 18:00 on February 17 for the time limit LT, and ¥450 for the transmission expense TC. Here, the DL condition list $DL_2$ and $DL_3$ are not described as they are similar to the DL condition list $DL_1$. Note that the unit records $UR_1$ which are exemplified herein do not show the identifier $ID_{CD}$ of $\beta_2$, which means the content reservation status data $D_{RS}$ does not include any DL condition list $L_{DL}$ for the content data $CD_B$.

Such content reservation status data $D_{RS}$ is forwarded from the processing unit 61 to the circuit interface 62 so as to be converted into a format which is suitable for the first communications circuit 4. Then, the format-converted data $D_{RS}$ is sent out onto the first communications circuit 4. The circuit interface 62 corresponds to a data transmission part herein. The content reservation status data $D_{RS}$ is received by the circuit interface 33 of the DCE 3 after going through several exchange systems 41 in the first communications circuit 4. By the circuit interface 33, the content reservation status data $D_{RS}$ is converted back (reconverted) into its original format before being forwarded to the user interface 32 via the processing unit 31. Then, the user interface 32 converts the received content reservation status data $D_{RS}$ before being sent out onto the transmission path 2 into a format that is suited therefor. The content reservation status data $D_{RS}$ is then received by the DTE 1 (sequence SQ1).

Figure 13A:
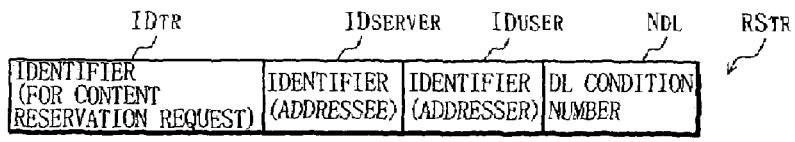
FIGS. 13a to 13g are diagrams for demonstrating the configuration of data and signals that are shown in both FIGS. 9 and 10.

In response to the content reservation status data $D_{RS}$, the DTE 1 generates a request (step ST2). Specifically, the DTE 1 reconverts the received content reservation status data $D_{RS}$ into its original format, and then displays each of the DL condition list $L_{DL}$, and the like, on the screen of the DTE 1 with the output processing having been executed (see FIG. 12). Thereby, the user can search for any DL condition list $L_{DL}$ whose time limit LT and transmission expense TC meet his/her needs while referring to the reservation status of each content data CD. If the user finds any suitable DL condition list $L_{DL}$, the user designates the DL condition number $N_{DL}$ thereof. In response, the DTE 1 generates a content reservation request $RS_{TR}$ such as the one shown in FIG. 13a. In FIG. 13a, the content reservation request $RS_{TR}$ is a signal which indicates that the user wants any specific content data CD to be transmitted for downloading, and includes at least an identifier $ID_{TR}$, an identifier $ID_{SERVER}$, an identifier $ID_{USER}$, and a DL condition number $N_{DL}$. Here, the identifier $ID_{TR}$ is the identifier which specifies that the signal is a content reservation request $RS_{TR}$. The identifier $ID_{SERVER}$ specifies which server 6 is the addressee of the content reservation request $RS_{TR}$, while the identifier $ID_{USER}$ specifies from where the content reservation request $RS_{TR}$ came (i.e., DTE 1). Here, since the DL condition number $N_{DL}$ is the one that is designated by the user, the server 6 can know which content data CD is requested together with the time limit LT and the transmission expense TC thereof.

In the case when the user does not find any DL condition list $L_{DL}$ matching his/her needs, the user operates the DTE 1 to designate any specific content data CD and time limit LT. In response, the DTE 1 generates a content reservation request $RS_{TR}$ such as the one shown in FIG. 13b. As compared to the content reservation request $RS_{TR}$ of FIG. 13a, the content reservation request $RS_{TR}$ of FIG. 13b carries the identifier $ID_{CD}$ and the time limit LT instead of the DL condition number $N_{DL}$.

Such a content reservation request $RS_{TR}$ in the DTE 1 is converted into a format that is suitable for the transmission path 2, and is then sent out on the transmission path 2 to be received by the user interface 32 of the DCE 3 (see FIG. 2). The, the content reservation request $RS_{TR}$ is reconverted in the user interface 32 before being forwarded to the circuit interface 33 via the processing unit 31. In the circuit interface 33, the received content reservation request $RS_{TR}$ is converted into a format that is suitable for the first communications circuit 4, and is then sent out onto the first communications circuit 4. The content reservation request $RS_{TR}$ is then received by the circuit interface 62 of the server 6 (see FIG. 3)(sequence SQ2). In the circuit interface 62, the content reservation request $RS_{TR}$ is reconverted and is forwarded to a memory (not shown) of the processing unit 61.

Figure 13B:
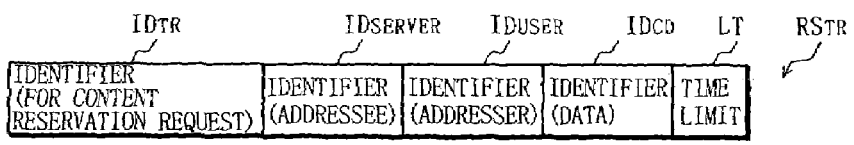
Figure 13C:
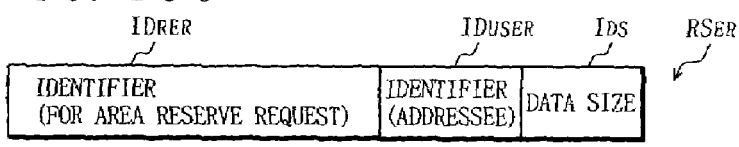
Figure 14:
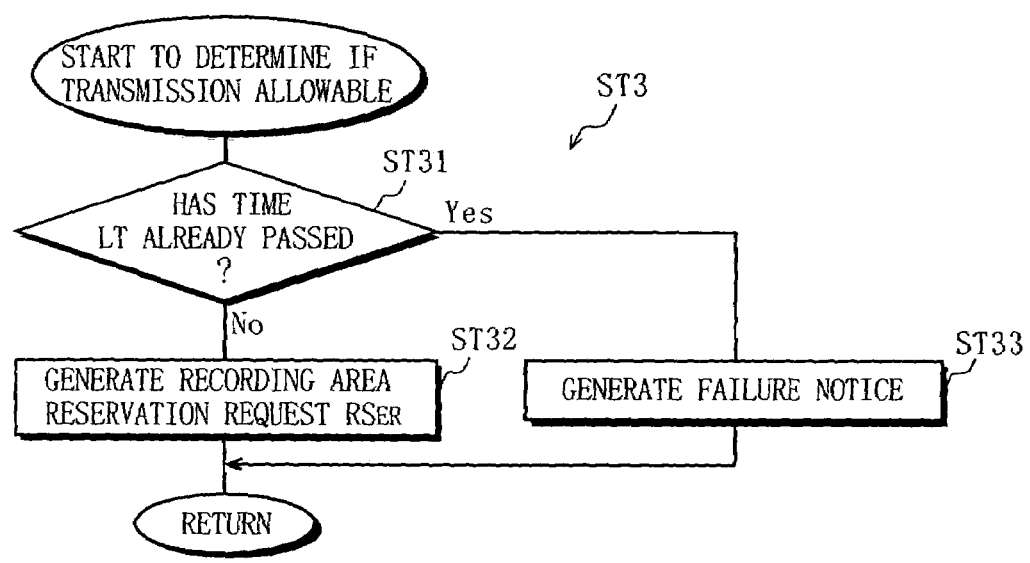
FIG. 14 is a flowchart showing step ST13 of FIG. 9 in more detail for its processing procedure.

The processing unit 61 checks the identifier $ID_{TR}$ in the stored data so as to determine whether the stored data is the content reservation request $RS_{TR}$. The processing unit 61 also determines whether or not the time limit LT in the content reservation request $RS_{TR}$ is still valid for transmitting the designated content data CD to the DTE 1 (step ST3). Here, refer to FIG. 14 for the detailed processing procedure of step ST3. In FIG. 14, the processing unit 61 of the server 6 sees whether the time limit LT in the content reservation request $RS_{TR}$ has already passed or not (step ST31). If the time limit LT has not yet passed, the processing unit 61 generates a recording area reserve request $RS_{ER}$ such as the one shown in FIG. 13c (step ST32). In FIG. 13c, the recording area reserve request $RS_{ER}$ is a signal indicating that a recording area in the content storage 35 of the DCE 3 (see FIG. 2) is requested to be reserved. Here, the recording area reserve request $RS_{ER}$ includes at least an identifier $ID_{RER}$, an identifier $ID_{USER}$, and a data size $I_{DS}$. The identifier $ID_{RER}$ specifies the received signal as a recording area reserve request $RS_{ER}$. The identifier $ID_{USER}$ indicates which DCE 3 shall reserve a recording area, and the DCE 3 designated here is the same as the DCE 3 that is set in the content reservation request $RS_{TR}$. The data size $I_{DS}$ shows the content data CD that is designated by the content reservation request $RS_{TR}$ by size, and is acquired by the processing unit 61 from the content storage 64 by using the identifier $ID_{CD}$. As for the identifier $ID_{CD}$, if the content reservation request $RS_{TR}$ is analyzed as being in the format of FIG. 13a, the DL condition number $N_{DL}$ therein is referred to and the corresponding identifier $ID_{CD}$ is extracted from the addressee list $L_{DEST}$ (see FIG. 5). On the other hand, if the content reservation request $RS_{TR}$ is in the format of FIG. 13b, the identifier $ID_{CD}$ is extracted directly therefrom. With the acquired identifier $ID_{ER}$, identifier $ID_{USER}$ and data size $I_{DS}$, the processing unit 61 generates the recording area reserve request $RS_{ER}$.

The recording area reserve request $RS_{ER}$ is then forwarded from the processing unit 61 to the circuit interface 62, and is sent out onto a control channel of the first communications circuit 4 (sequence SQ3). Here, the control channel is the one that is provided in advance to control the equipment (e.g., exchange system 41, DCE 3) in the first communications circuit 4. Note that in order to transmit data that was most recently received by the DTE 1 such as the content reservation status data $D_{RS}$ a data channel of the first communications circuit 4 is used instead of the control channel. The recording area reserve request $RS_{ER}$ goes through several exchange systems 41 before being received by any one predetermined exchange system 41. The predetermined exchange system 41 typically is the one that is located closest to the DCE 3.

In response to the recording area reserve request $RS_{ER}$, the predetermined exchange system 41 generates a recording area reserve instruction $IS_{ER}$ (step ST4). The recording area reserve instruction $IS_{ER}$ is a signal which instructs the DCE 3 to reserve a recording area, and includes at least, as shown in FIG. 13d, an identifier $ID_{IER}$, an identifier $ID_{USER}$, and a data size $I_{DS}$. Here, the identifier $ID_{USER}$ and the data size $I_{DS}$ are the same as those in the presently received recording area reserve request $RS_{ER}$. The identifier $ID_{IER}$ specifies itself as a recording area reserve instruction $IS_{ER}$. The generated recording area reserve instruction $IS_{ER}$ goes through the predetermined exchange system 41 to the DCE 3, specifically to the circuit interface 33 (see FIG. 2) via the control channel of the first communications circuit 4 (sequence SQ4). Note that, in step ST4, the predetermined exchange system 41 operates as a recording area management unit herein.

With the reconversion processing that is executed on the recording area reserve instruction $IS_{ER}$, the circuit interface 33 of the DCE 3 forwards the reconverted recording area reserve instruction $IS_{ER}$ to the processing unit 31. In response thereto, the processing unit 31 has the content storage 35 reserve a recording area that is large enough for the data size $I_{DS}$ that is designated thereby (step ST5). With the recording area successfully reserved, the processing unit 31 generates a positive acknowledgement $AS_{RD}$. The positive acknowledgement $AS_{RD}$ is a signal indicating that the recording area has been reserved, and, as shown in FIG. 13e, includes at least an identifier $ID_{RD}$ for identifying the received signal as a positive acknowledgement $AS_{RD}$, an identifier $ID_{USER}$ for specifying from where the positive acknowledgement $AS_{RD}$ came, and an identifier $ID_{SERVER}$ specifying an addressee thereof (i.e., the server 6). Such a positive acknowledgement $AS_{RD}$ is sent out onto the control channel of the first communications circuit 4 via the circuit interface 33. Then, the positive acknowledgement $AS_{RD}$ is received by the circuit interface 62 of the server 6 (see FIG. 3) via the first communications circuit 4 (sequence SQ5).

With the reconversion processing that is executed on the positive acknowledgement $AS_{RD}$, the circuit interface 62 forwards the positive acknowledgement $AS_{RD}$ to the processing unit 61. In response thereto, the processing unit 61 generates a reception completion notice $AS_{RR}$ (step ST6). The reception completion notice $AS_{RR}$ is a signal notifying the DTE 1 that the content reservation request $RS_{TR}$ has been successfully received, and, as shown in FIG. 13f, includes at least an identifier $ID_{RR}$, an identifier $ID_{USER}$, and an identifier $ID_{SERVER}$. The identifier $ID_{RR}$ specifies the received signal as a reception completion notice $AS_{RR}$. The identifier $ID_{USER}$ specifies which DTE 1 is to receive the reception completion notice $AS_{RR}$, while the identifier $ID_{SERVER}$ specifies from which server 6 the reception completion notice $AS_{RR}$ came. The reception completion notice $AS_{RR}$ is also subjected to the conversion processing by the circuit interface 62 as is the content reservation status data $D_{RS}$, and is then sent out onto the first communications circuit 4 (sequence SQ6). Then, the reception completion notice $AS_{RR}$ is processed in the same manner as the content reservation status data $D_{RS}$ by the DCE 3, is transmitted over the transmission path 2, and is then received by the DTE 1.

In response to the reception completion notice $AS_{RR}$, the DTE 1 carries out reception completion output processing (step ST7). In detail, the DTE 1 shows the user, on its screen, a message indicating that the content reservation request $RS_{TR}$ that was transmitted in step ST2 has been normally processed in steps ST3 and ST6 by the server 6.

If the processing in steps ST3 and ST6 is not normally completed for some reason, although not shown in FIG. 9, the processing unit 61 generates a failure notice if it is determined, in step ST31, that the time limit LT of the content reservation request $RS_{TR}$ has already passed (FIG. 14; step ST33). The processing unit 61 generates the failure notice also responding to a negative acknowledgement from the DCE 3. The negative acknowledgement is generated if a reservation for the recording area was not successful, and the negative acknowledgment is transmitted to the server 6 in the same manner as the positive acknowledgement $AS_{RD}$. The generated failure notice goes through, as the reception completion notice $AS_{RR}$, the first communications circuit 4, the DCE 3, and the transmission path 2, and is then received by the DTE 1. Upon reception of the failure notice, the DTE 1 shows the user, on its screen, a message indicating that the currently transmitted content reservation request $RS_{TR}$ has failed to be normally processed in steps ST3 and ST6 by the server 6.

As for the above-described sequences SQ1 to SQ6, note that each downlink signal, which are the content reservation status data $D_{RS}$, the recording area reserve request $RS_{ER}$, the recording area reserve instruction $IS_{ER}$, and the reception completion notice $AS_{RR}$, is transmitted over the first communications circuit 4. The first embodiment, however, is not restricted thereto, and it is also possible to transmit each downlink signal over the second communications circuit 5 instead, but the first communications circuit 4 is still preferable here as the downlink signals are not multicast.

Figure 15:
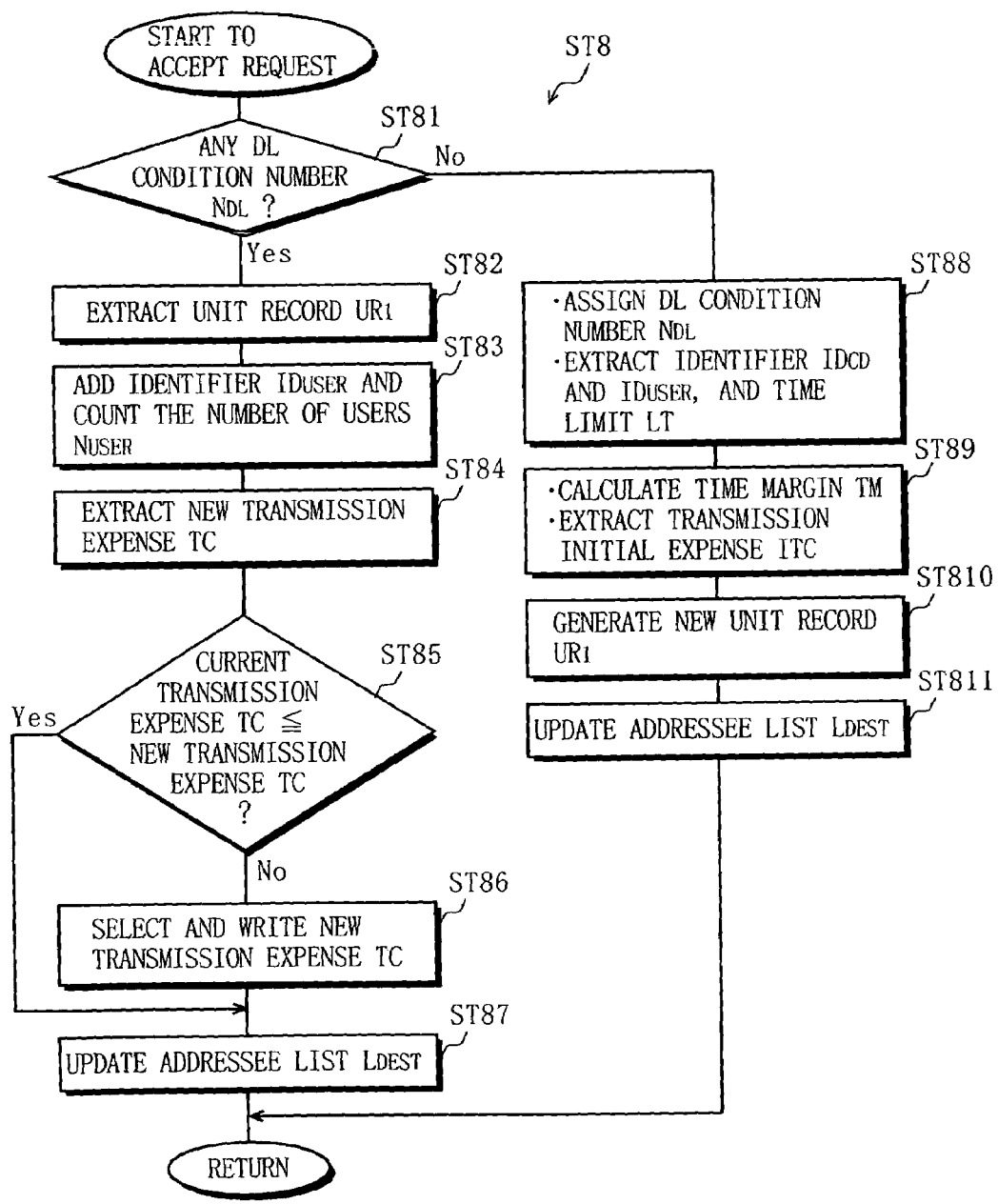
FIG. 15 is a flowchart showing step ST8 of FIG. 10 in more detail for its processing procedure.

With step ST7 completed, FIG. 10 is now referred to for its sequence chart. In FIG. 10, the processing unit 61 carries out request acceptance processing (step ST8). Step ST8 corresponds to an acceptance processing part herein, and FIG. 15 shows the detailed processing procedure thereof. In FIG. 15, the processing unit 61 of the server 6 first determines whether the currently received content reservation request $RS_{TR}$ carries any DL condition number $N_{DL}$ (step ST81). If the currently received content reservation request $RS_{TR}$ carries a DL condition number $N_{DL}$ (see FIG. 13a), the processing unit 61 extracts, from the addressee list $L_{DEST}$, any unit record $UR_1$ corresponding to the DL condition number $N_{DL}$ on the memory thereof (step ST82). Then, the processing unit 61 extracts the identifier $ID_{USER}$ from the content reservation request $RS_{TR}$, adds the extracted identifier $ID_{USER}$ to the unit record $UR_1$ on the memory, and then counts the total number of the identifiers $ID_{USER}$ therein (that is, the number of users $N_{USER}$ that are requesting the same content data CD) (step ST83).

Then, the processing unit 61 extracts, from the transmission expense list $L_{TC}$ (see FIG. 7), the transmission expense TC corresponding to the counted number of users $N_{USER}$ (step ST84). Here, to avoid confusion, the transmission expense TC which is found in the unit record $UR_1$ and which is retrieved in step ST82 is now referred to as a current transmission expense TC, while the transmission expense TC which is found in the transmission expense list $L_{TC}$ in step ST84 is referred to as a new transmission expense TC.

The processing unit 61 then compares the new transmission expense TC with the current transmission expense TC to see which is more expensive (step ST85). If the current transmission expense TC is equal to or cheaper than the new transmission expense TC, the procedure skips step ST86 and goes to step ST87; otherwise the procedure goes through step ST86. That is, if the new transmission expense TC is cheaper than the current transmission expense TC, the processing unit 61 considers the new transmission expense to be good for the user and thus overwrites the current transmission expense TC of the unit record $UR_1$ on the memory (step ST86) with the new transmission expense TC. Then, the procedure goes to step ST87. In step ST87, the processing unit 61 stores the unit record $UR_1$ on the memory in the addressee list storage 65 so as to update the addressee list $L_{DEST}$ therein. After step ST87 is completed, the processing unit 61 ends the processing of FIG. 15.

Hereinafter, the update processing (steps ST82 to ST86) that is executed on the unit record $UR_1$ is specifically described. Assume now that is the time to start the processing in step ST81, and a currently received content reservation request $RS_{TR}$ shows 1 for the DL condition number $N_{DL}$ and $\alpha_1$ for the identifier $ID_{USER}$. Further, extracted in step ST82 the unit record $UR_{11}$ shown in FIG. 5 is presumably extracted in step ST82. In such a case, after step ST83, the unit record $UR_{11}$, will include $\alpha_1$ in the identifier $ID_{USER}$ as shown in FIG. 16a, and the number of identifier $ID_{USER}$ becomes 500 in total. Therefore, according to the transmission expense list $L_{TC}$ of FIG. 7, the transmission expense TC of ¥400 is extracted in step ST84. Accordingly, after step ST86, as shown in FIG. 16b, the unit record $UR_{11}$, shows ¥400 for the transmission expense TC.

As another example, the number of identifier $ID_{USER}$ and the transmission expense TC in the unit record $UR_{11}$, is presumably 10 and ¥550 when step ST81 is started, but the rest remains the same as in the above example. In this case, the new transmission expense TC (¥550) shows no change from the current transmission expense TC (¥550). Only a difference herein is $\alpha_1$ added in the unit record $UR_{11}$.

As is known from the above, in the request acceptance processing, the more users that request for data transmission under the same conditions (e.g., time limit LT, content data CD), the cheaper the transmission expense TC becomes.

In step ST81 of FIG. 15, if the content reservation request $RS_{TR}$ does not carry a DL condition number $N_{DL}$ (see FIG. 13b), the processing unit 61 generates a new unit record $UR_1$. For this purpose, the processing unit 61 assigns a unique DL condition number $N_{DL}$ to the to-be-generated new unit record $UR_1$, and then extracts identifier $ID_{CD}$, identifier $ID_{USER}$, and a time limit LT from the content reservation request $RS_{TR}$ (step ST88). The processing unit 61 then calculates a difference, i.e., a time margin TM, between the time limit LT and the current time. Then, the processing unit 61 refers to the initial transmission expense list $L_{TC}$ (FIG. 8) to see which transmission initial expense ITC therein corresponds to the calculated time margin TM (step ST89). The found transmission initial expense ITC is extracted and is then written into the to-be-generated unit record $UR_1$. With the extracted information including the DL condition number $N_{DL}$, the identifier $ID_{CD}$, the time limit LT, the transmission expense TC, and the identifier $ID_{USER}$, a new unit record $UR_1$ is generated (step ST810). Then, the processing unit 61 stores the generated unit record $UR_1$ in the addressee list storage 65 so as to update the addressee list $L_{DEST}$ therein (step ST811). After step ST87 is completed, the processing unit 61 ends the processing of FIG. 15.

Hereinafter, the processing of adding a new unit record $UR_1$ (steps ST88 to ST811) is specifically described. Assume now that is the time to start the processing in step ST81, and that the addressee list $L_{DEST}$ that is referred to is the one in FIG. 5. Also, the currently received content reservation request $RS_{TR}$ presumably shows $\beta_1$ for the identifier $ID_{CD}$, $\alpha_1$ for the identifier $ID_{USER}$, 20:00 on February 15 for the time limit LT, and the current time is 20:00 on February 14. In this case, a time margin TM is 24 hours, and a transmission initial expense ITC to be retrieved in step ST89 is accordingly ¥480. Therefore, after step ST811 is completed, the addressee list $L_{DEST}$ additionally includes the new unit record $UR_{14}$ such as the one as shown in FIG. 16c.

As is known from the above, in the processing of adding a new unit record, the longer the time margin TM is before the time limit LT in the content reservation request $RS_{TR}$, the transmission initial expense ITC will be set to be cheaper. It is to be understood that the longer time margin TM leads the server 6 to accept more content reservation requests $RS_{TR}$ requesting for the transmission of the same content data CD under the same conditions.

Figure 17:
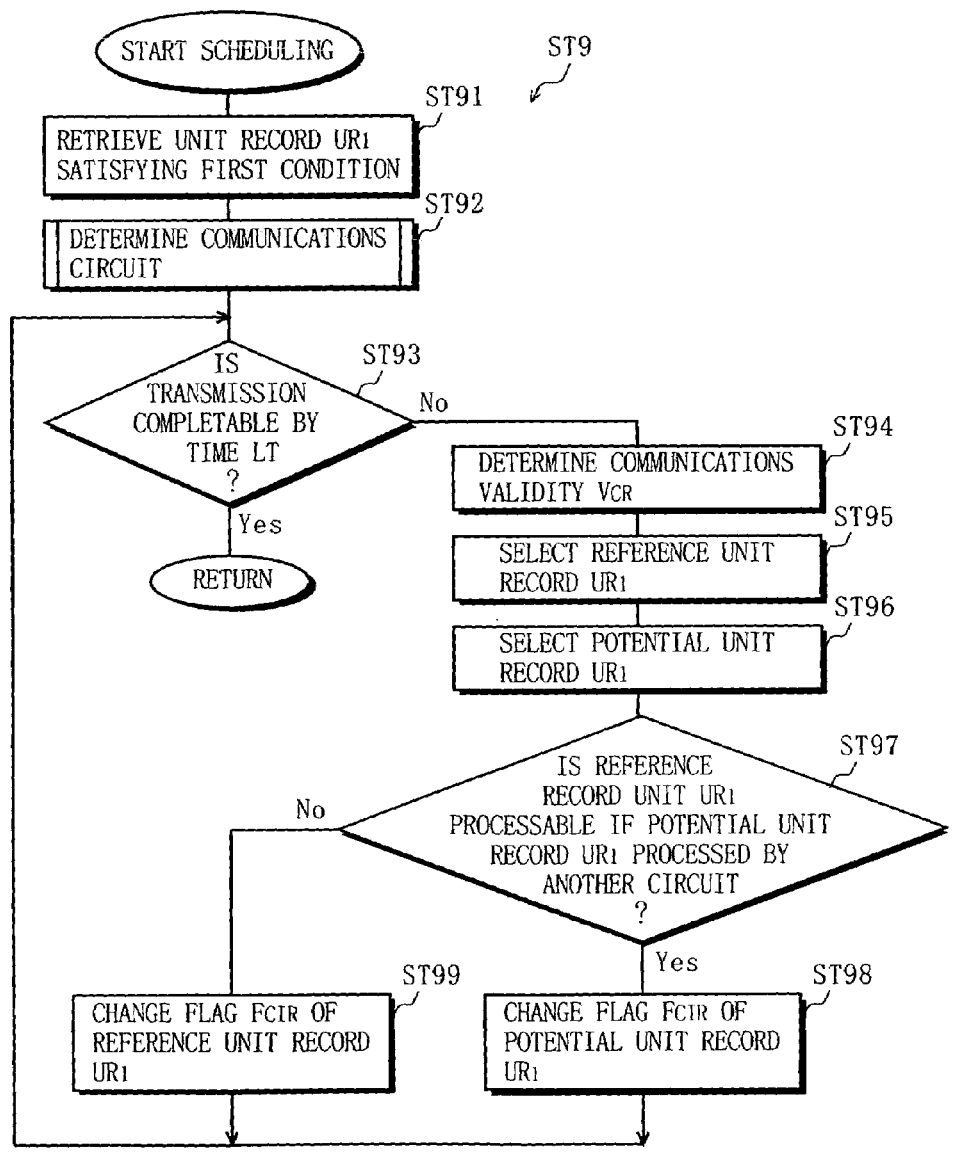
FIG. 17 is a flowchart showing step ST9 of FIG. 10 in more detail for its processing procedure.

As shown in FIG. 10, the processing unit 61 of the server 6 carries out scheduling so as to determine a timing for transmitting the content data CD (step ST9). Although such scheduling is presumed here to be carried out only after the addressee list $L_{DEST}$ is updated in step ST8, the first embodiment is not restricted thereto, and the scheduling may also be carried out within a predetermined interval. Step ST9 corresponds to a scheduling part herein, and FIG. 17 shows the detailed processing procedure thereof. In FIG. 17, the processing unit 61 searches the addressee list $L_{DEST}$ (see FIG. 5) for unit records $UR_1$ satisfying a first condition of "time limit LT−current time<reference time RT" (step ST91). Here, the reference time RT is a predetermined time allowance plus a time which ensures that the data transmission from the server 6 to the DCE 3 is completed by the time limit LT, and the reference time RT is set in advance with consideration of parameters that are typified by the transmission bandwidth of the first and second communications circuits 4 and 5. Hereinafter, unit records $UR_1$ satisfying the first condition are referred to as a first group.

Figure 18:
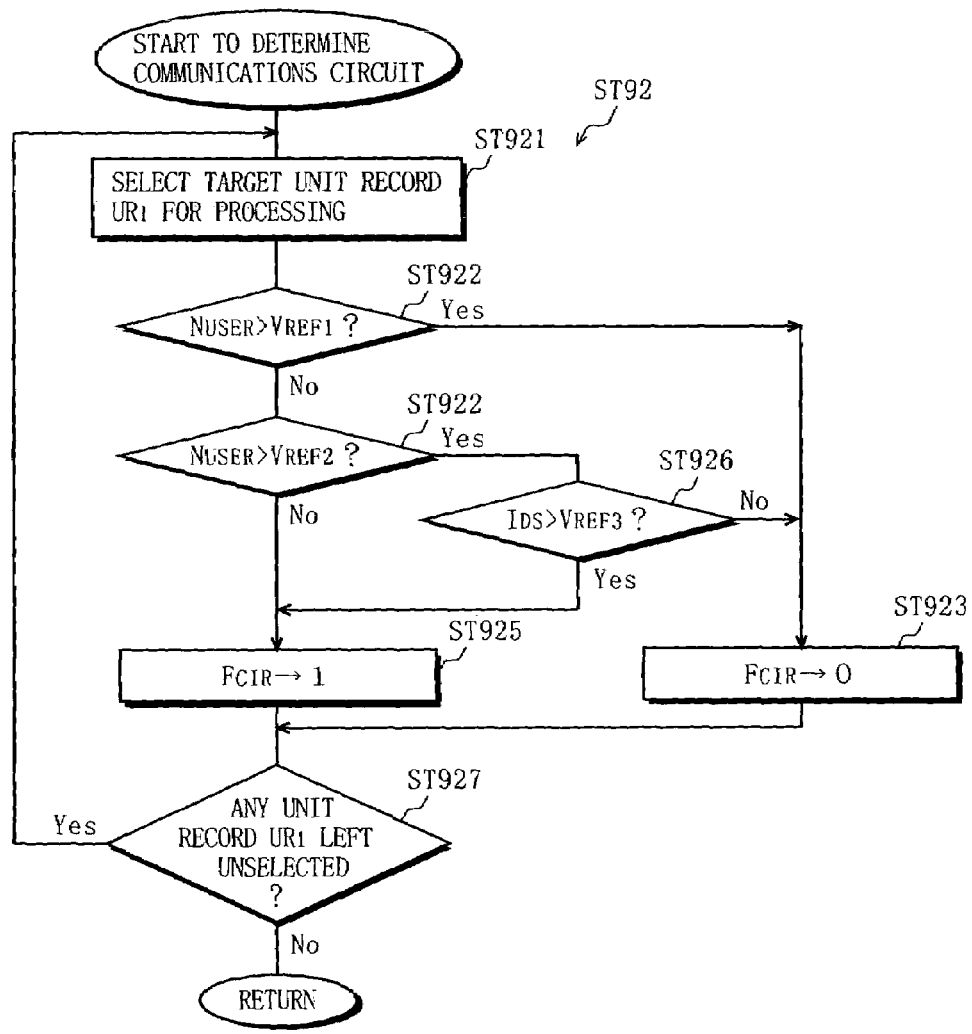
FIG. 18 is a flowchart showing step ST92 of FIG. 17 in more detail for its processing procedure.

For each unit record $UR_1$ that is included in the first group, the processing unit 61 then determines which communications circuit 4 or 5 is to be used for data transmission (step ST92). See FIG. 18 for the detailed processing procedure thereof. In FIG. 18, the processing unit 61 selects one target unit record $UR_1$ from the first group (step ST921). Then, the processing unit 61 determines whether the number of users $N_{USER}$ in the selected target unit record $UR_1$ exceeds a reference value $V_{REF1}$ (step ST922). The reference value $V_{REF1}$ is a threshold for the number of users requesting for the content data CD to be downloaded under the conditions in the unit record $UR_1$, and the reference value $V_{REF1}$ is set in advance with consideration of parameters regarding the first and second communications circuits 4 and 5 in terms of their respective transmission bandwidths.

As described above, the second communications circuit 5 (satellite circuit) is suited for multicasting, and when the number of users is quite large for data transmission, the second communications circuit 5 is a better selection in view of the transmission expense. Therefore, when the number of users $N_{USER}$ exceeds the reference value $V_{REF1}$, the processing unit 61 determines that the second communication circuit 5 is suitable for the transmission of the content data CD that is designated by the target unit record $UR_1$. For example, assuming that the reference value $V_{REF1}$ is now 499, as exemplified in FIG. 19a, the processing unit 61 sets 0 to the communications circuit flag $F_{CIR}$ in the unit record $UR_1$ (step ST923).

On the other hand, when the number of users $N_{USER}$ does not exceed the reference value $V_{REF1}$ in step ST922, the processing unit 61 then uses a reference value $V_{REF2}$ to compare with the number of users $N_{USER}$ (step ST924). The reference value $V_{REF2}$ is also a threshold, and is set to be, at least, smaller than the reference value $V_{REF1}$.

As already described, the first communications circuit 4 (public circuit) is not suited for multicasting, but is better for transmitting the same data to the fewer DTEs 1 (i.e., users) in view of the transmission expense per bit. Therefore, when the number of users $N_{USER}$ does not exceed the reference value $V_{REF2}$, the processing unit 61 determines that the first communication circuit 4 is suitable for the transmission of the content data CD that is designated by the target unit record $UR_1$. Then, as exemplified in FIG. 19b, the processing unit 61 sets 1 to the communications circuit flag $F_{CIR}$ in the target unit record $UR_1$ (step ST925).

In the case where the number of users $N_{USER}$ exceeds the reference value $V_{REF2}$ in step ST924, the processing unit 61 then uses a reference size $V_{REF3}$ to compare with the data size $I_{DS}$ of the content data CD that is retrieved from the content storage 64 (step ST926). The reference size $V_{REF3}$ is a threshold for the size of the content data CD to be transmitted under the conditions in the target unit record $UR_1$, and is set in advance with consideration of parameters that are typified by the respective transmission bandwidths of the first and second communications circuits 4 and 5.

Here, the first communications circuit 4 has a wider bandwidth for data transmission than the transmission bandwidth of the second communications circuit 5. Accordingly, even when the number of users $N_{USER}$ exceeds the reference value $V_{REF2}$, if the processing unit 61 determines that the data size $I_{DS}$ exceeds the reference size $V_{REF3}$ in step ST926, step ST925 is carried out. Otherwise, the procedure goes to step ST923.

After either step ST923 or ST925 is completed, that is, after the communications circuit flag $F_{CIR}$ is set, the processing unit 61 determines if any unit record $UR_1$ is left yet unselected (step ST927). If any unit record $UR_1$ is determined to be unselected, the procedure repeats step ST921 and onward until no unit record $UR_1$ is left unselected. On the other hand, if no determined no, this is the end of the processing of FIG. 18.

With the processing of FIG. 18 being carried out, either the communications circuit 4 or 5 is applied to every unit record $UR_1$ in the first group. However, as already described, the second communications circuit 5 (satellite circuit) will soon be short of transmission bandwidth if the content data CD that is designated by a number of unit records $UR_1$ is transmitted thereover. Therefore, if the number of unit records $UR_1$ that are assigned 0 in the communications circuit flag $F_{CIR}$ becomes large in step ST92, the server 6 is placed in a wait state for transmitting the content data CDs of some unit records $UR_1$, thereby possibly causing those not to be ready in the DCE 3 by their own time limits LT. In order to avoid this, after step ST92 is completed, the processing unit 61 determines, for every content data CD that is designated by each of the unit records $UR_1$ in the first group, whether the transmission of each designated content data CD can be completed by their own time limits LT (step ST93). In detail, the determination is made, for the unit record $UR_1$ that is assigned 1 in the communications circuit flag $F_{CIR}$, by comparing its time limit LT with a transmission completion time. Here, the transmission completion time from the current time is approximately calculated from the transmission bandwidth of the first communications circuit 4 and the size $I_{DS}$ of the content data CD. For the unit record $UR_1$ that is assigned 0 in the communications circuit flag $F_{CIR}$, the same manner as described above is applicable, but the transmission bandwidth that is used for calculation of the transmission completion time is of the second communications circuit 5. With such processing being executed, if the processing unit 61 determines that every content data CD in the first group is transmittable by each of their time limits LT, the processing of FIG. 17 is ended.

On the other hand, if the processing unit 61 determines that the content data CD that is designated by at least one unit record $UR_1$ as being nontransmittable by each respective time limit LT, a communications validity $V_{CR}$ is calculated for every unit record $UR_1$ (step ST94). Hereinafter, any unit record $UR_1$ whose content data CD is determined as being nontransmittable by the time limit LT in step ST93 is referred to as a nontransmittable unit record $UR_1$. The communications validity $V_{CR}$ is an indicator that is used to verify the reliability of the communications circuit that is selected in step ST92. Here, as the communication validities $V_{CR}$ are calculated differently for the first and second communications circuit 4 and 5, the communications validity $V_{CR}$ for the first communications circuit 4 is referred to as a communications validity $V_{CR1}$, while the communications validity $V_{CR}$ for the second communications circuit 5 is referred to as a communications validity $V_{CR2}$. For the unit record $UR_1$ that is assigned 1 in the communications circuit flag $F_{CIR}$, the communications validity $V_{CR1}$ becomes higher as the number of users $N_{USER}$ in the identifier $ID_{USER}$ becomes fewer, the size $I_{DS}$ of the content data CD becomes larger, and the time margin TM becomes longer. Conversely, for the unit record $UR_1$ that is assigned 0 in the communications circuit flag $F_{CIR}$, the communications validity $V_{CR2}$ becomes higher as the number of users $N_{USER}$ in the identifier $ID_{USER}$ increases, the size $I_{DS}$ of the content data CD becomes smaller, and the time margin TM becomes shorter.

After step ST94 is completed, the processing unit 61 searches the nontransmittable unit record(s) $UR_1$ so as to find a reference unit record $UR_1$ showing the closest time limit TM to the current time (step ST95). Then, the processing unit 61 selects a potential unit record $UR_1$ from among those unit records $UR_1$ in the first group except for the nontransmittable unit record(s) $UR_1$. Here, the potential unit record $UR_1$ is the one satisfying a second condition of having the closer time margin TM to the current time and the communications validity $V_{CR}$ which is lower than the reference unit record $UR_1$, and being assigned the same communications circuit flag $F_{CIR}$ as the reference unit record $UR_1$ (step ST96).

The processing unit 61 then transmits the content data CD that is specified by the potential unit record $UR_1$ over the communications circuit that is different from the communications circuit currently assigned thereto, and determines if the content data CD that is specified by the reference unit record $UR_1$ is transmittable by the time limit LT (step ST97). Here, the processing of step ST97 is described in detail. As for the content data CD that is specified by the potential unit record $UR_1$, a transmission time from the server 6 to the DCE 3 can be calculated from its data size $I_{DS}$ and the transmission bandwidth of the communications circuit depending on which of the communication circuits has been applied thereto. In the same manner as described above in step ST93, a transmission completion time ET of the reference unit record $UR_1$, which shows the time in which the specified content data CD reaches the DCE 3, can be calculated based on the current time. If the transmission time that is calculated for the potential unit record $UR_1$ is deducted from the calculated transmission completion time ET of the reference unit record $UR_1$ a new transmission completion time ET is approximated for the case where the content data CD that is specified by the potential unit record $UR_1$ is transmitted over the communications circuit that is different from the communications circuit currently applied thereto. If the approximated new transmission completion time ET comes earlier than the time limit LT of the reference unit record $UR_1$, the processing unit 61 determines the time limit LT of the reference unit record $UR_1$ as assurable, and thus changes, in value, the communications circuit flag $F_{CIR}$ of the potential unit record $UR_1$ (step ST98). Conversely, if the new transmission completion time is not earlier than the time limit LT of the reference unit record $UR_1$, the processing unit 61 changes, in value, the communications circuit flag $F_{CIR}$ of the reference unit record $UR_1$ (step ST99). After step ST98 or ST99 is completed, the procedure returns to step ST93 and repeats the above-described processing.

Figure 20A:
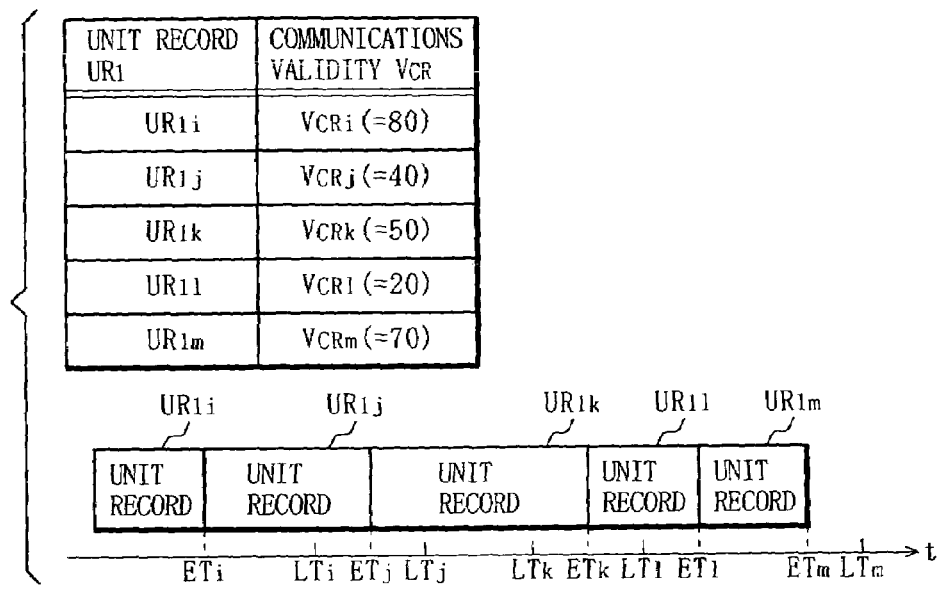
FIGS. 20a and 20b are diagrams schematically showing the processing of steps ST94 to ST99 of FIG. 17.
Figure 20B:
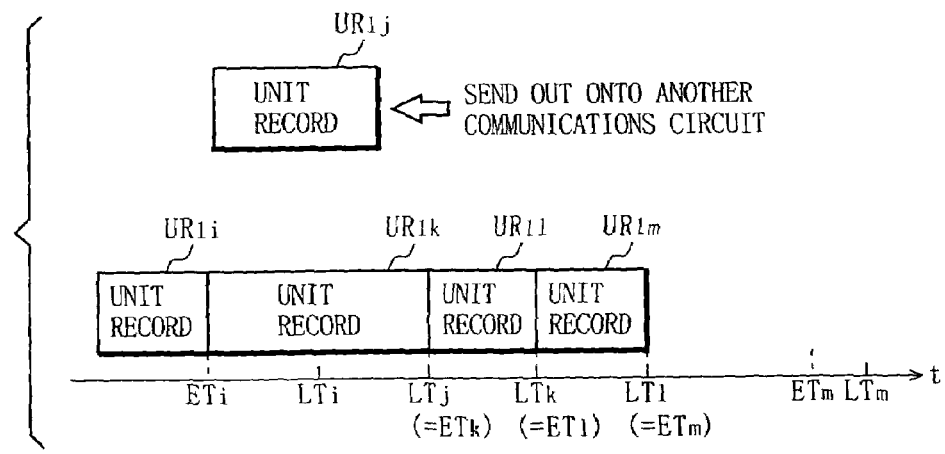

Described next, schematically, is the processing of steps ST94 to ST99 with reference to FIGS. 20a and 20b. In this example, it is assumed that determination made in step ST93 is NO, and five unit records $UR_{1i}$, $UR_{1j}$, $UR_{1k}$, $UR_{1l}$, and $UR_{1m}$ have the same communications circuit flag $F_{CIR}$ but vary in time limit LT from $LT_i$ to $LT_m$ as shown by the time axis t of FIG. 20a. On the time axis t, content data CDs that are specified by the unit records $UR_{1i}$ to $UR_{1m}$, respectively, are also indicated by the transmission completion times $ET_i$ to $ET_m$. In this case, as is known from the transmission completion times $ET_k$ and $ET_l$ which are after the time limits $LT_k$ and $LT_l$, the unit records $UR_{1k}$ and $UR_{1l}$ are selected as the nontransmittable unit record $UR_1$. In FIG. 20a, the unit records $UR_{1i}$ to $UR_{1m}$ are also indicated by the communications validity $V_{CR1}$ to $V_{CRm}$, respectively.

In this example, the unit record $UR_{1k}$ is selected as the reference unit record $UR_1$ in step ST95, and the unit record $UR_{1j}$ is selected as the potential unit record $UR_1$ in step ST96. Then, in step ST97, the content data CD of the unit record $UR_{1j}$ is transmitted over the communications circuit that is different from the communications circuit that is assigned thereto so as to determine whether the time limit $LT_k$ of the reference unit record $UR_{1k}$ is assurable. If the time limit $LT_k$ of the reference unit record $UR_{1k}$ is determined to be assurable in step ST98, as shown in FIG. 20b, the communications circuit flag $F_{CIR}$ of the unit record $UR_{1j}$ is changed in value so that the unit record $UR_{1j}$ will be sent out onto the other communications circuit.

Figure 21:
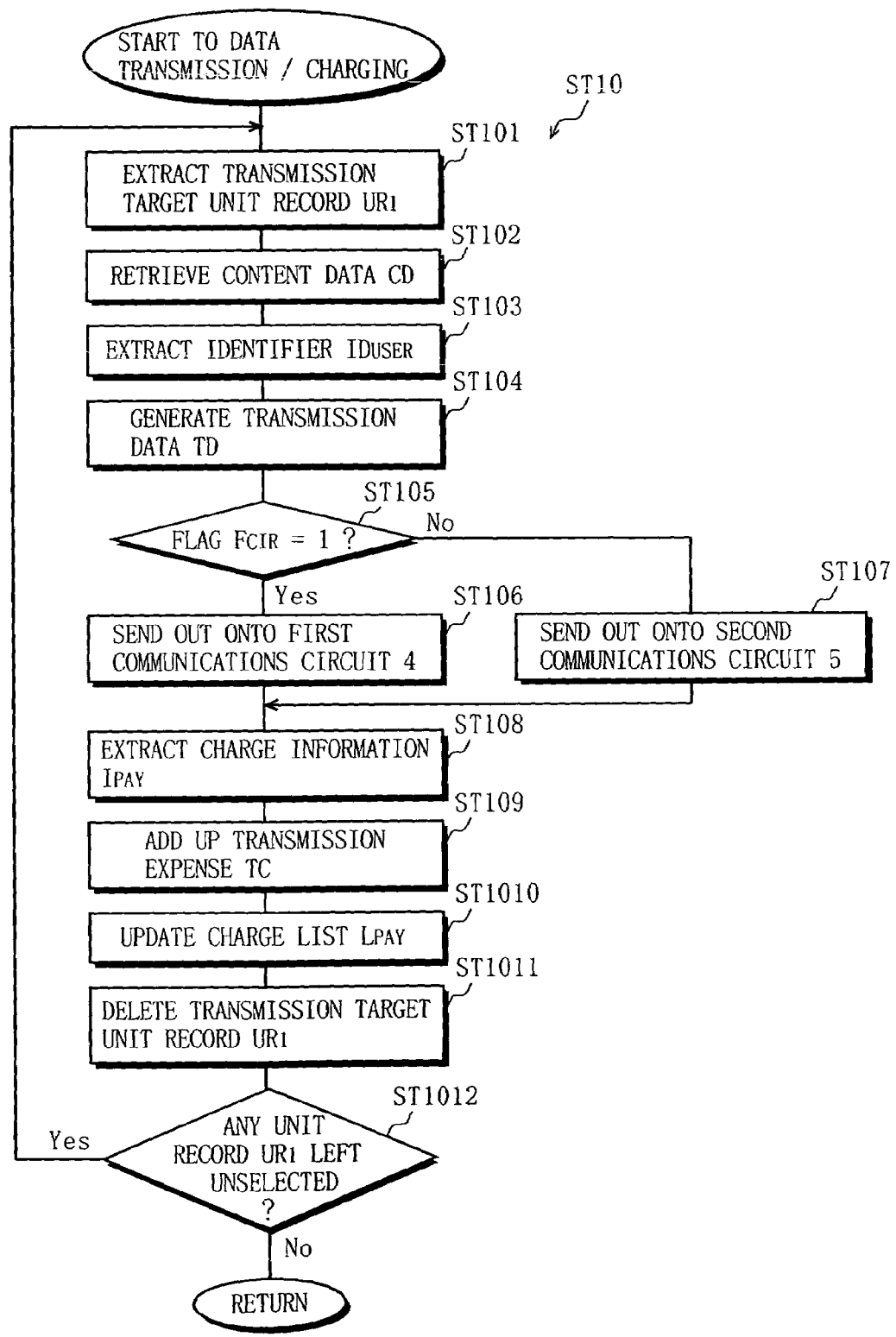
FIG. 21 is a flowchart showing step ST10 of FIG. 10 in more detail for its processing procedure.

Refer to FIG. 10 again. The processing unit 61 carries out data send-out and charge processing so as to transmit the content data CD to the user and charge therefor (step ST10). Although the data send-out and charge processing is presumed here to be carried out after scheduling (step ST9), the first embodiment is not restricted thereto, and step ST10 may be carried out also within a predetermined interval. Step ST10 corresponds to a data send out part herein, and FIG. 21 shows the detailed processing procedure thereof. In FIG. 21, the processing unit 61 first refers to the addressee list $L_{DEST}$ so as to select any one unit record $UR_1$ to which the communications circuit flag $F_{CIR}$ is set and its time limit LT is closest to the current time (hereinafter, referred to as transmission target unit record $UR_1$) (step ST101). Then, the processing unit 61 retrieves, from the content storage 64, any content data CD having the same identifier $ID_{CD}$ as in the transmission target unit record $UR_1$ (step ST102). The processing unit 61 also extracts the identifier $ID_{USER}$ from the transmission target unit record $UR_1$ (step ST103).

Figure 13D:
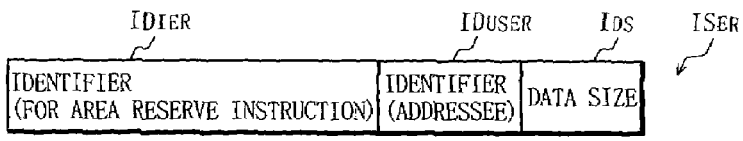
Figure 13E:
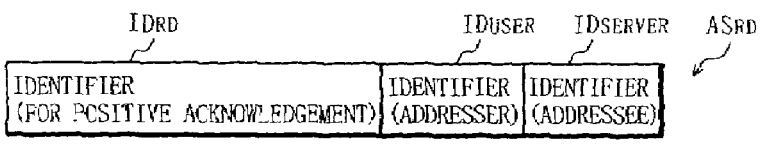
Figure 13F:
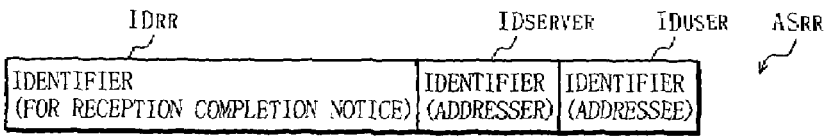
Figure 13G:
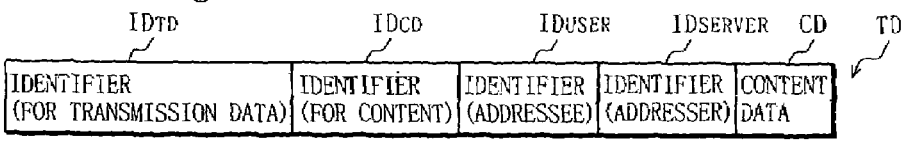

The processing unit 61 then generates transmission data TD such as the one shown in FIG. 13g (step ST104). In FIG. 13g, the transmission data TD includes an identifier $ID_{TD}$, an identifier $ID_{CD}$, an identifier $ID_{USER}$, an identifier $ID_{SERVER}$, and a content data CD. Here, the identifier $ID_{TD}$ specifies the received signal as being the transmission data TD. The identifier $ID_{CD}$ and the identifier $ID_{USER}$ are the identifiers which are set in the transmission target unit record $UR_1$. The identifier $ID_{SERVER}$ specifies from which server 6 the transmission data TD came. The content data CD is the one that is retrieved in step ST102.

After step ST104 is completed, the processing unit 61 checks the communications circuit flag $F_{CIR}$ in the transmission target unit record $UR_1$ for its value (step ST105). If the communications circuit flag $F_{CIR}$ shows 1, the processing unit 61 forwards the transmission data TD that is generated in step ST104 to the circuit interface 62 (see FIG. 3). In response, the circuit interface 62 converts the received transmission data TD into a format which is suitable for the first communications circuit 4 before sending out the received transmission data TD onto the first communications circuit 4 as shown by sequence SQ7 of FIG. 11 (step ST106).

On the other hand, if the communications circuit flag $F_{CIR}$ shows 0 in step ST105, the transmission data TD is forwarded to the transmission unit 63 of the server 6. In the transmission unit 63, the transmission data TD is then subjected to the conversion processing before being sent out onto the second communications circuit 5 (step ST107). For the sake of convenience, such transmission data TD that is not sent out onto the second communications circuit 5 is not shown.

After step ST106 or ST107 is completed, the processing unit 61 carries out charge processing. In detail, the processing unit 61 makes an access to the charge list storage 66 (see FIG. 6) so as to extract, from the charge list $L_{PAY}$ therein, the charge information $I_{PAY}$ each corresponding to the identifier $ID_{USER}$ that is set in the transmission target unit record $UR_1$ (step ST108). Then, the processing unit 61 adds, to each of the retrieved charge information $I_{PAY}$, the transmission expense TC that is found in the transmission target unit record $UR_1$ (step ST109) so that the charge information $I_{PAY}$ is updated. The processing unit 61 then makes another access to the charge list storage 66 so as to register the updated charge information $I_{PAY}$ and the corresponding identifier $ID_{USER}$ in the charge list $L_{PAY}$ (step ST110). In this manner, the user is charged for the currently-received content data CD according to the amount that is written in the transmission expense TC.

After step ST1010 is completed, the processing unit 61 deletes the current transmission target unit record $UR_1$ from the addressee list $L_{DEST}$ (step ST1011), and then determines if any unit record $UR_1$ is left unselected as the transmission target unit record $UR_1$ (step ST1012). If any unit record $UR_1$ is left unselected, the procedure returns to step ST101 so as to repeat the above-described processing. If no unit records $UR_1$ are left unselected, this is the end of this step ST10.

Figure 22:
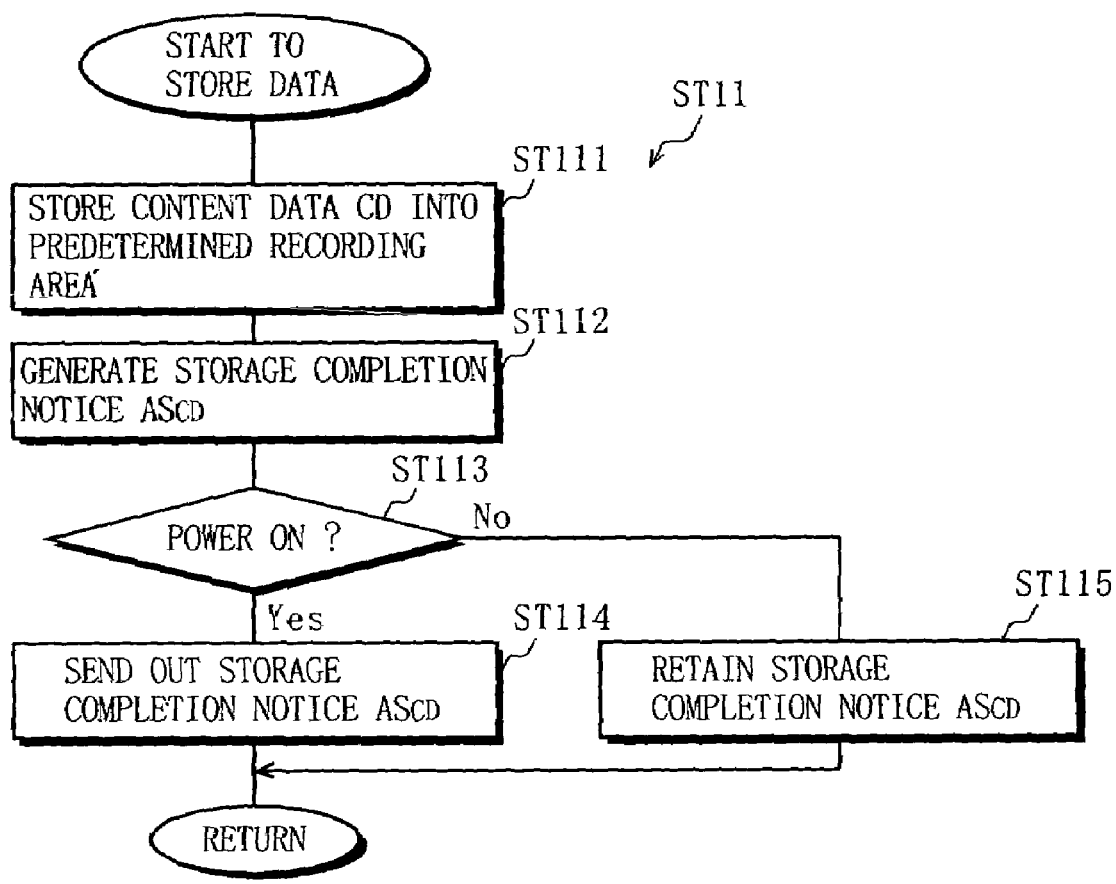
FIG. 22 is a flowchart showing step ST11 of FIG. 10 in more detail for its processing procedure.

After sending out the transmission data TD onto the first communications circuit 4 in step ST106, the transmission data TD goes through several exchange systems 41 before being received by the circuit interface 33 of the DCE 3. The circuit interface 33 reconverts the transmission data TD before forwarding the transmission data TD to the processing unit 31. In response, the processing unit 31 carries out data storage processing (step ST11). FIG. 22 shows the detailed processing procedure thereof. In FIG. 22, the processing unit 31 stores at least the identifier $ID_{CD}$ and the content data CD of the received transmission data TD into a predetermined recording area in the content storage 35 (step ST111). Here, the predetermined recording area is the recording area that is reserved in step ST5.

Next, the processing unit 31 generates a storage completion notice $AS_{CD}$ (step ST112), which is data indicating that the content data CD that is requested by the content reservation request $RS_{TR}$ has been stored. Typically, the storage completion notice $AS_{CD}$ is data in the HTML (Hyper Text Markup Language) format or an e-mail. Note that in order to generate data in the HTML format, the DCE 3 needs to function as a WWW server, and to generate an e-mail, the DCE 3 needs to function as a mail server. In the case where the DCE 3 functions both as the WWW server and the mail server, the DCE 3 needs to be set in advance, by the user's operation or by default, in which format such a to-be-generated storage completion notice $AS_{CD}$ is to be transmitted.

After step ST112, the processing unit 31 checks whether the DTE 1 is ON (step ST113), and if the DTE 1 is ON, the processing unit 31 forwards the generated storage completion notice $AS_{CD}$ to the user interface 32. The user interface 32 then converts the storage completion notice $AS_{CD}$ into a format which is suitable for the transmission path 2 before sending out the storage completion notice $AS_{CD}$ onto the transmission path 2 (step ST114). The storage completion notice $AS_{CD}$ is the received by the DTE 1 (sequence SQ8).

It should be noted that, if step ST107 is carried out, the transmission data TD is transmitted over the second communications circuit 5. In detail, the server 6 notifies a predetermined multicast address to the DCE 3 which is to receive the current transmission data TD. Then, the server 6 generates the transmission data TD having the multicast address set as the identifier $ID_{USER}$ therein (see FIG. 13g). Such transmission data TD goes through, from the transmission unit 63 of the server 6, the transmission antenna 51, the artificial satellite 52, and the reception antenna 53, and is then received by the reception unit 34 of the DCE 3, which has been notified of the multicast address in advance. If this is the case, the reception unit 34 is the one which subjects the transmission data TD to the reconversion processing before forwarding the transmission data TD to the processing unit 31. Then, responding to the transmission data TD, the processing unit 31 carries out the data storage processing in the same manner as described above but only if the transmission data TD carries the notified multicast address. If the transmission data TD carries some other identifier $ID_{USER}$, the processing unit 31 needs to discard the transmission data TD. This is because the transmission data TD reaches every DCE 3 in the data transmission system once the transmission data TD is sent out onto the second communications circuit 5.

Upon reception of the storage completion notice $AS_{CD}$, the DTE 1 shows the user a message indicating that the content data CD at his/her request has been stored (step ST12). The user thus knows that the requested content data CD has reached the DCE 3. The user operates the DTE 1, whenever convenient, so as to designate the content data CD that is stored in the DCE 3. In response, the DTE 1 generates a read request $RS_{RO}$ (step ST13), which is a signal that requests the DCE 3 to read the user designated content data CD from the content storage 35.

The read request $RS_{RO}$ is converted by the DTE 1 into a format which is suitable for the transmission path 2, sent out onto the transmission path 2, received by the user interface 32 of the DCE 3 (see FIG. 2), reconverted in the user interface 32, and is then forwarded to the processing unit 31 (sequence SQ9). Upon reception of the read request $RD_{RO}$, the processing unit 31 reads the currently designated content data CD from the content storage 35 and forwards the currently designated content data CD to the user interface 32. The content data CD is converted in the user interface 32 and is sent out onto the transmission path 2, and thus is received by the DTE 1 (step ST14) (sequence SQ10). The DTE 1 reconverts the content data CD, and then carries out the output processing thereon so as to present the user with what the content data CD carries (step ST15).

Here, in step ST113 of FIG. 22, if the processing unit 31 determines that the DTE 1 is OFF, the storage completion notice $AS_{CD}$ is retained in the processing unit 31 until the DTE 1 is turned ON (step ST115). Once the DTE 1 is detected to be turned ON, the processing unit 31 forwards the retained storage completion notice $AS_{CD}$ to the user interface 32 and then to the DTE 1 via the transmission path 2. Thereafter, the processing of steps ST12 to ST15 is carried out between the DTE 1 and the DCE 3.

As described in the foregoing, in the data transmission system of the first embodiment, the server 6 can selectively send out transmission data TD onto the communications circuits 4 and 5 in consideration of their respective suitability for multicasting. Accordingly, when many users are requesting that the same content data CD be transmitted, the server 6 basically selects the second communications circuit 5, which is suited for multicasting. Thus, the data transmission can be done with a cheaper transmission expense, which is good for users. Therefore, according to the first embodiment, the present data transmission system is more advantageous in view of cost performance to the conventional data transmission system. By the way, Japanese Patent Laid-Open Publication NO. 10-41976 (98-41976) discloses a method for selecting one communications circuit from among those communication circuits connecting several terminals depending on the size of transmitting data. Here, if this method is combined with the data transmission system of Japanese Patent Laid-Open Publication No. 8-140081 (96-140081) referred to in the description of the Prior Art above (hereinafter, referred to as a conventional data transmission system), a dispute may arise about the difference from the data transmission system of the first embodiment. With such a combination, however, an efficient use of the communications circuits cannot be achieved unlike the data transmission system of the first embodiment. This is because, with the combination, a time when to transmit the data is first determined, and then which communications circuit is to be used therefore is determined. Under such control of this combination, however, no consideration is given to suitability of the communications circuits. Thus, it may happen that first data which is not so popular among users is transmitted over a communications circuit which is suitable for multicasting, and in the meantime, even if second data which is quite popular needs to be transmitted, the communications circuit is not available for the transmission of the second data. As a result, the second data has to be transmitted over another communications circuit which is not suitable for multicasting.

On the other hand, in order to determine a time when to transmit transmission data TD and which communications circuit to use for the transmission of the transmission data TD, the data transmission system of the first embodiment carries out scheduling (step ST9; specifically, steps ST921 to ST926) while referring to a time limit LT and communications information (e.g., the state of the communications circuits 4 and 5, the number of users $N_{USER}$, and the data size $I_{DS}$) of every unit record $UR_1$ satisfying the first condition. Further, to avoid such a problem as in the above-described combination, the data transmission system of the first embodiment uses a communications validity VCR to verify the reliability of the selected communications circuit (see steps ST94 to ST99). In this manner, the data transmission system of the first embodiment achieves an efficient use of the communications circuits 4 and 5; that is, the data transmission system of the first embodiment controls communications traffic, while ensuring the user designated time limit LT.

Further, according to the first embodiment, the server 6 uses content reservation status data $D_{RS}$ to show the user what are the conditions for downloading his/her requested content data CD and how many other users are so far requesting the same content data CD. The content reservation status data $D_{RS}$ is also utilized for inducing other users by showing what content data CD is available under what conditions. Once the user finds any condition matching his/her needs, the DTE 1 generates and transmits a content reservation request $RS_{TR}$ including a DL condition number $N_{DL}$ corresponding to the conditions. Upon reception of the transmitted content reservation request $RS_{TR}$, the server 6 updates the corresponding unit record $UR_1$ so that the transmission expense TC of the content data CD is accordingly reduced. Therefore, the user can acquire the content data CD with less expense if her/his request is transmitted together with some other users' resquests.

Even if the user does not find conditions matching his/her needs, the user can designate his/her own conditions. In this case, the later his/her designated time limit LT shows, the cheaper his/her expense for the content data CD becomes.

Note that, in the first embodiment, the conditions for downloading the content data CD is exemplified by the time limit LT. The first embodiment, however, is not restricted thereto, and the transmission expense TC and the number of users $N_{USER}$ may be also included. With the transmission expense TC, the procedure goes to step ST92 when the transmission expense TC in every unit record $UR_1$ satisfying the first condition becomes a predetermined value or lower in step ST91 in the scheduling processing of FIG. 17. On the other hand, with the number of users $N_{USER}$, the procedure goes to step ST92 when the number of users $N_{USER}$ in every unit record $UR_1$ satisfying the first condition becomes a predetermined value or more in step ST91.

Further, in the first embodiment, when the incoming content reservation request $RS_{TR}$ is in such form as the one illustrated in FIG. 13*b*, the procedure goes through steps ST88 to ST811 of FIG. 15, and the processing unit 61 thus generates a new unit record $UR_1$ to be added to the addressee list $L_{DEST}$. However, if the addressee list $L_{DEST}$ already carries any unit record $UR_1$ which satisfies a third condition, this is not restrictive. Here, the unit record $UR_1$ satisfying the third condition is the unit record $UR_1$ having the earlier time limit LT and the cheaper transmission expense TC than the new unit record $UR_1$, and showing the same content data CD as the new unit record $UR_1$. If such a unit record $UR_1$ is found in the addressee list $L_{DEST}$, the identifier $ID_{USER}$ of the new unit record $UR_1$ is written thereinto, and the transmission expense TC in the list is accordingly updated. In this manner, as far as the content data CD becomes ready in the DCE 3 sooner than the user designated time limit LT, the user settles for nothing, and if anything, has the merits of a cheaper expense.

Here, the processing unit 61 may carry out the same processing as described above when, in the addressee list $L_{DEST}$, one unit record $UR_1$ shows the cheapest transmission expense TC and the earliest time limit LT among all of the unit records $UR_1$ corresponding to the same content data CD.

Further, in the first embodiment, the DCE 3 is exemplified as simply transmitting the content data CD to the DTE 1 in response to a read request $RS_{RO}$ from the DTE 1. This is not restrictive, and the processing unit 31 of the DCE 3 may delete the received content data CD from the content storage 35 immediately after the transmission of the content data CD or after a predetermined time interval. Alternatively, even if no read request $RS_{RO}$ comes from the DTE 1, the processing unit 31 may store the received content data CD in the content storage 35, and then delete the content data CD after a predetermined time interval. If those are the cases, the timing of deletion is added to the transmission data TD before being transmitted to the DCE 3 or is previously registered in the DCE 3.

In the first embodiment, as shown by the sequence SQ8 of FIG. 10, a storage completion notice $AS_{CD}$ is exemplified as being transmitted to the DTE 1 from the DCE 3. This is not restrictive, and the server 6 may perform the transmission after receiving the transmission data TD.

Also in the first embodiment, as shown by the sequence SQ1 of FIG. 9, the content reservation status data $D_{RS}$ is exemplified as being transmitted to the DTE 1 via the DCE 3. This is not restrictive, and the DTE 1 may directly transmit the content reservation status data $D_{RS}$ in response to the user's operation. In this case, the user refers to the content reservation status data $D_{RS}$ on the DTE 1 which is not connected to the DCE 3. Note that the content reservation request $RS_{TR}$ still needs to carry the identifier $ID_{USER}$ of the DCE 3 as the content data CD is stored in the DCE 3.

Also in the first embodiment, the server 6 is exemplified as including the addressee list storage 65, the charge list storage 66, the transmission expense list storage 67, and the transmission initial expense list storage 68. This is not restrictive, and the server 6 may be simply in charge of generating and transmitting the content reservation status data $D_{RS}$ and transmitting the content data CD, and leave other processing to other equipment in the data network 7 or to some other server connected thereto.

Also, the DCE 3 may be configured so as to also be connectable to a telephone and/or facsimile. If connected in such a manner, information such as service class comes over the first communication circuit 4, for example, together with audio data for telephone and/or character data for facsimile. Thus, the DCE 3 refers to such information and forwards the audio data and/or character data to the telephone and/or facsimile, respectively, prior to the transmission data TD and content reservation status data $D_{RS}$. This is because such data needs to be responded to in real time.

Also in the first embodiment, the timing of transmission is exemplified as being determined for every unit record $UR_I$ in order of the increasing time limit LT. This is not restrictive, and the transmission time may be determined. In such case, the transmission time also has to ensure the time limit LT.

Further, in the first embodiment, the content data CD is exemplified as being stored in the content storage 64 together with the identifier $ID_{CD}$ and the data size $I_{DS}$ added thereto for clarity. This is not restrictive, and the content storage 64 stores only the content data CD, and assigns the identifier $ID_{CD}$ that is unique thereto when the processing unit 61 generates the transmission data TD.

Also in the first embodiment, one content data CD is transmitted from the DCE 3 to the DTE 1. The number of content data CD is not restrictive, and the content data CD that are designated by read request $RS_{RO}$ may be transmitted together with any other which is not designated thereby. If this is the case, the applicability is accordingly widened. For example, assume that a read request $RD_{RO}$ is issued for content data CD which is a movie. In response thereto, the DCE 3 may transmit, to the DTE 1, the requested content data CD together with other content data CD which is an advertisement. Accordingly, the DTE 1 can display both the movie and the advertisement on its screen.

Also in the first embodiment, the content data CD is exemplified as carrying moving picture data, static picture data, audio data, object data, character data, or a combination of two or more of such data. This is not restrictive, and the content data CD may also carry a program which changes the contents thereof (e.g., characters) for display. For example, when a program instructs the DTE 1 to display a letter of "A" in a first period but a letter of "B" in a second, the DTE 1 follows such an instruction.

As another example, assume that a read request $RD_{RO}$ is issued for the content data CD which is a WEB page. In response thereto, the DCE 3 may transmit, to the DTE 1, the requested content data CD together with other content data CD which is a banner advertisement (or an information link to advertisement), which is not requested by the user. Accordingly, the DTE 1 can display both the WEB page and the banner advertisement on its screen, thereby leading to advertisement revenue for information providers.

Also in the first embodiment, the content data CD is exemplified as being chargeable. However, there may also be free content data. For any server containing only such free content data in the data transmission system, only free content data needs to be transmitted to the DTE 1 via the DCE 3, if requested, without going through such processing as scheduling and charging in the first embodiment. In such a case, the DCE 3 counts how often the DTE 1 has so far requested the same free content data. As for any free content data which is popular among users, the DCE 3 inquires, during when communications traffic of the first communications circuit 4 is low, the server if the content data has been updated. If the content data has been updated, the server responsively transmits the latest version of the content data CD to the DCE 3. The DCE 3 then stores the received content data CD in the content storage 35. As such, the DCE 3 may carry out cache processing so as to acquire any new free content data, autonomously, irrespective of whether a transmission request comes from the DTE 1. Unlike the DTE 1 which is basically turned ON and OFF by the user, the DCE 3 is always ON. This is the reason why the DCE 3 can carry out such a cache processing spontaneously.

In the above-described cache processing, the DCE 3 can know the level of the communications traffic with the following three techniques. First, the DCE 3 inquires anyone of the exchange systems 41 in the first communications circuit 4 about the current traffic level, and then uses a predetermined reference value for comparison therewith. Second, any one the exchange systems 41 notifies the DCE 3 about the current traffic level, and the DCE 3 then uses the reference value for comparison. Lastly, the DCE 3 is provided with a timer, and carries out the cache processing when the timer indicates a predetermined time. The time may be during a period from late-night to early-morning when the communications traffic is lowered on the first communications circuit 4.

For the cache processing, the recording area in the content storage 35 is preferably divided into smaller areas. Some smaller areas of the content storage 35 are allocated for storing chargeable content data CDs, and some smaller areas are allocated for free content data that are acquired by the DCE3 through the cache processing. This prevents the recording area from being wholly occupied by the free content data after the cache processing.

If the transmission request is received from the DTE 1, the DCE 3 checks to see whether the content data CD that is designated thereby is stored in any of those smaller areas of the content storage 35. If the content data CD is stored in one of the smaller areas, the DCE 3 reads the content data there from without accessing the server, and transmits the read content data to the DTE 1. Such cache processing allows the DTE 1 to quickly acquire the content data at the user's request. Also, since the cache processing is carried out when the communication traffic level is low, the communications traffic can be controlled on the basis of time, thereby improving the first communications circuit 4 in transmission efficiency.

In the first embodiment, the DCE 3 is exemplified as acquiring the chargeable content data CD from the server 6. This is not restrictive, and the DCE 3 may carry out processing so as share the free content data with other DCEs 3. In the process, the DCE 3 (the one which receives data) inquires other DCEs about the content data (especially the popular content data). The inquired DCEs 3 responsively check themselves to determine if they are carrying the content data, and if any of the inquired DCEs carries the content data, the content data is transmitted therefrom to the inquiring DCE 3.

Alternatively, the server 6 manages information, in the form of a list, indicating which DCE 3 in the data transmission system carries what content data, and the server 6 transmits the list to the DCE 3 which is looking for any specific content data. With the help of this list, the content data can be quickly located and acquired by data communications only between two DCEs 3.

Accordinly, by sharing the content data among many DCEs, server access is reduced, and further, the content data becomes quickly available if the content data is located in the closer DCE 3.

In the case where the DCE 3 wants to acquire a content data CD but the recording area in the content storage of the DCE 3 has an insufficient capacity to store the desired content data CD, the DCE 3 requests any of the other DCEs 3 to store the content data CD therein. If the request is accepted, the content data CD is stored in the other DCE 3 until the DCE 3 finds sufficient room in its recording area to store the desired content data CD. Then, the DCE 3 communicates with the other DCE 3 to acquire the content data CD therefrom.

Here, the DCE 3 may be implemented with SMTP (Simple Mail Transfer Protocol) and POP (Post Office Protocol) to function as a mail server. If this is the case, as in the above, e-mails are preferably distributed when the communications traffic on the first communications circuit 4 is low. As to a high priority e-mail, however, the DCE 3 preferably distributes the high priority e-mail regardless of the communications traffic on the first communications circuit 4. Here, since the DCE 3 is powered ON all of the time, the DCE 3 always receive e-mails. The DTE 1 thus carries out an e-mail program, and accesses the DCE 3 responding to the user's operation to receive e-mails. In particular, the DTE 1 receives e-mails from the DCE 3 in close proximity thereto without having to use the first communications circuit 4, and thus, those e-mails become available to the user sooner.

The DCE 3 may also be implemented with a program to realize a fire wall, which prevents malicious hackers from breaking into the DCE 3 and the DTE 1. More specifically, the DCE 3 carries a list indicating a qualified data addresser and addressee, and if any data comes from those that are not listed, the DCE 3 discards the data. The DCE 3 also discards data that is addressed to an addressee which is not found in the list. Accordingly, the DTE 1 can be protected from so-called spam. For a case where a child operates the DTE 1, the list may be password protected so as to prevent the DTE 1 from receiving content data including sexual and violent descriptions or content. Further, the DCE 3 detects unauthorized data that are typified by a virus in data that is transmitted from/received by the circuit interface 33. Such detected unauthorized data are discarded with no exception, whereby the DTE 1 can be protected from virus infection.

Also in the first embodiment, the DCE 3 responds to a read request $RS_{RO}$ from the DTE 1, and transmits a content data CD itself to the DTE 1. Here, if the DCE 3 functions as a WWW server, the DCE 3 assigns the content data CD a URL (Uniform Resource Locator), and stores the URL in the content storage 35. Also, the DCE 3 generates in advance an HTML file including a simple description of the assigned URL and the content data CD. Accordingly, the user can refer to any content data CD not only via the DTE 1 that is connected to the DCE 3 through the transmission path 2 but also via other equipment (e.g., a personal computer, a cellular phone, and an information mobile terminal) having a WWW browser that is implemented therein. The same is applicable if the DCE 3 generates an e-mail including a simple description of the assigned URL and the content data CD, and the DCE 3 accordingly transmits the e-mail with a preassigned e-mail address. Here, whether the DCE generates the HTML file or e-mail may be up to the user based on the content data CD.

Second Embodiment

Described next is a data transmission system according to a second embodiment of the present invention. Basically, the data transmission systems of the first and second embodiments are structurally the same as shown in FIG. 1, and herein, any component which is new in the second embodiment is described in detail, but the constituent elements of the data transmission system of the second embodiment which are the same as those of the first embodiment are otherwise provided with the same reference numeral as in the first embodiment and are not described again.

Figure 23A:
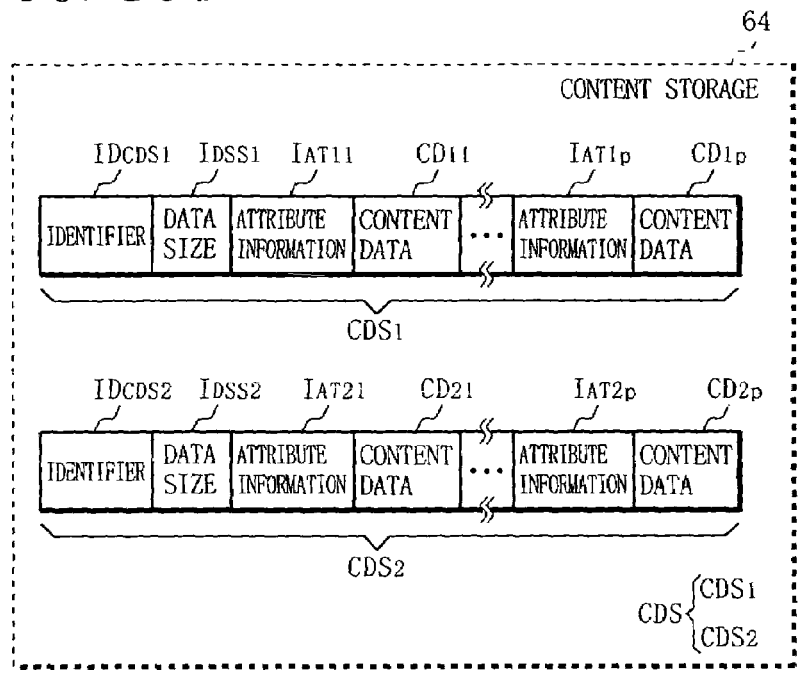
FIGS. 23a to 23c are drawings demonstrating a content data set CDS according to a second embodiment of the present invention.

Described first is the server 6, whose structure is shown in FIG. 3. However, in the second embodiment as shown in FIG. 23a, several content data CD sets CDS are stored in the content data storage 64, not the content data CD as in the first embodiment. In FIG. 23a, each content data set CDS includes an identifier $ID_{CDS}$, a data size $I_{DSS}$, and several combinations of attribute information $I_{AT}$ and corresponding content data CD. The identifier $ID_{CDS}$ uniquely specifies the location where the content data set CDS is stored (i.e., the recording area in the content storage 64 of the server 6) in the data transmission system. The data size $I_{DSS}$ indicates the content data set CDS by size, and the attribute information $I_{AT}$ indicates the corresponding content data CD by attribute. With regard to the content data CD, no mention is given here as the content data CD is the same as in the first embodiment. Here, the content data set CDS may include the identifier $ID_{CD}$ and the data size $I_{DS}$ for the corresponding content data CD as in the first embodiment, but this is not essential here and is neither described nor shown.

The content data set CDS is specifically described next. In the second embodiment, the content storage 64 stores content data sets $CDS_1$ and $CDS_2$. The content data $CDS_1$ is presumably an advertisement this is made by a shop or a company, and carries p (a natural number equal to or larger than 1) content data $CD_{11}$, to $CD_{1p}$ each varying in content. The content data $CD_{11}$ is provided with attribute information $I_{AT11}$ corresponding thereto. Similar to other content data $CD_{12}$ to $CD_{1p}$, attribute information $I_{AT12}$ to $I_{AT1p}$ is respectively provided.

Figure 23B:
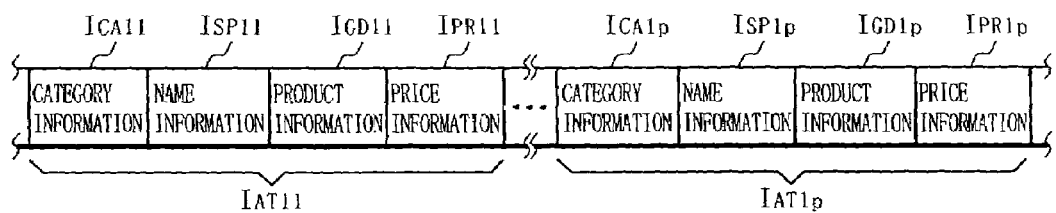

The attribute information $I_{AT11}$ indicates the content data $CD_{11}$, by attribute. Specifically, as shown by FIG. 23b, the attribute information $I_{AT11}$ is composed of category information $I_{CA11}$, name information $I_{SP11}$, product information $I_{GD11}$, and price information $I_{PR11}$. The category information $I_{CA11}$ indicates the advertisement that is specified by the corresponding content data $CD_{11}$, by category, i.e., the advertiser's business. The name information $I_{SP11}$ indicates the advertiser by shop or company name, the product information $I_{GD11}$ indicates the product or service in the advertisement, and the price information indicates the price of the product or service. Note that the attribute information $I_{AT11}$ is not limited only to such a category, name, product, and price, and may, for example, also include information indicating the number of stocks of the product. Similar to the attribute information $I_{AT11}$, other attribute information $I_{AT12}$ to $I_{AT1p}$ is composed of, respectively, the category information $I_{CA11}$ to $I_{CA1p}$, the name information $I_{SP11}$ to $I_{SP1p}$, the product information $I_{GD11}$ to $I_{GD1p}$, and the price information $I_{PR11}$ to $I_{PR1p}$.

Figure 23C:
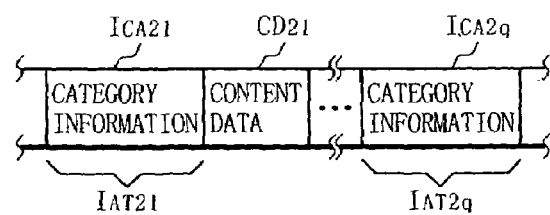

Next, the content data set $CDS_2$ is herein presumably news, and carries q (a natural number equal to or larger than 1) content data $CD_{21}$ to $CD_{2q}$ each varying in content. The content data $CD_{21}$ is provided with attribute information $I_{AT21}$ corresponding thereto. Similar to other content data $CD_{22}$ to $CD_{2q}$, attribute information $I_{AT22}$ to $I_{AT2q}$ is respectively provided. The attribute information $I_{AT21}$ to $I_{AT2q}$ indicates the corresponding content data $CD_{21}$ to $CD_{2q}$ by attribute, and, as shown in FIG. 23c, is specifically composed of the category information $I_{CA21}$ to $I_{CA2q}$ each varying in content depending on the corresponding content data $CD_{21}$ to $CD_{2q}$. For example, the category information $I_{CA21}$ to $I_{CA2q}$ for the content data $CDS_2$ may be entertainment, finance, sports, and the like.

Figure 24:
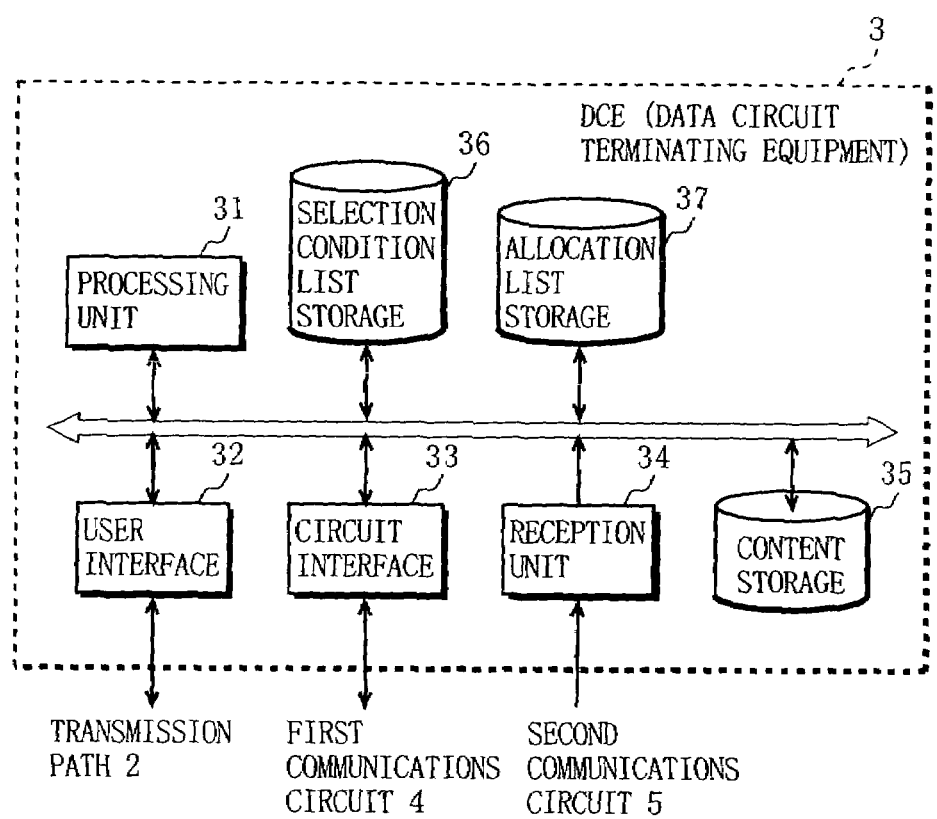
FIG. 24 is a block diagram showing the configuration of a DCE 3 in the second embodiment.

Described next is the DCE 3. As shown in FIG. 24, the differences between the DCE 3 of the second embodiment and the DCE 3 (see FIG. 2) in the first embodiment are a selection condition list storage 36 and an allocation list storage 37. The selection condition list storage 36 and the allocation list storage 37 store, respectively, a selection condition list $L_{SC}$ and an allocation list $L_{ST}$ (both will be described later).

Figure 25:
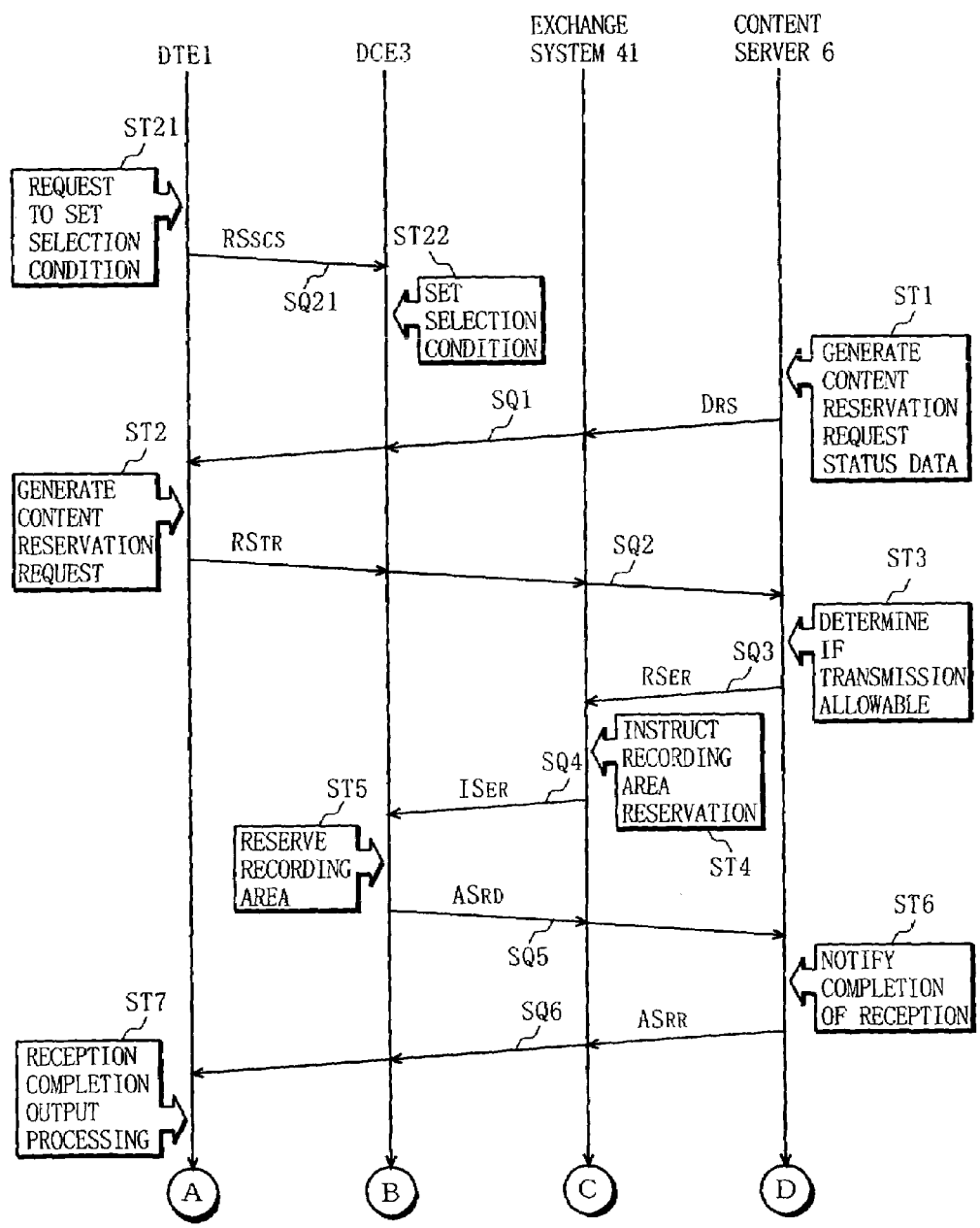
FIG. 25 is a first half of a sequence chart showing a communications procedure in a data transmission system of the second embodiment.
Figure 26:
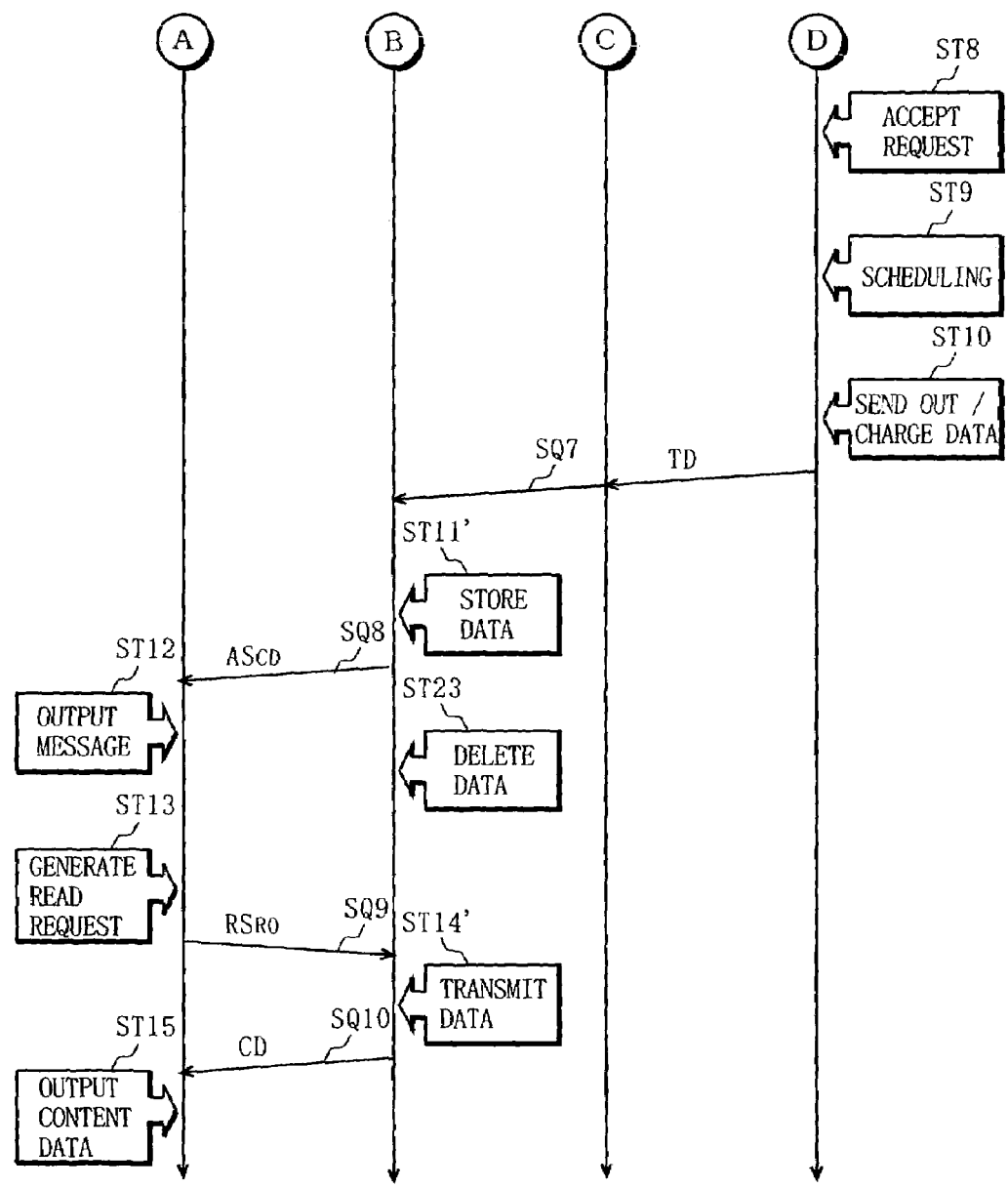
FIG. 26 is a second half of the sequence chart showing the communications procedure in the data transmission system of the second embodiment.

Described next with reference to the sequence charts of FIGS. 25 and 26 is the communications procedure for the DTE 1 to acquire a content data CD in the above structured data transmission system. The sequence chart of FIG. 25, as compared with the sequence chart of FIG. 9, additionally includes steps ST21 and ST22, and sequence SQ21. The rest of FIG. 25 is basically the same as FIG. 9, and thus the steps and sequences which are the same as those in FIG. 9 are denoted by the same step and sequence numbers, and only a difference, if any, between the respective steps and sequence numbers are described herein. As for the sequence chart of FIG. 26, as compared with the sequence chart of FIG. 10, steps ST11 and ST14 are replaced by steps ST11' and ST14', and additionally includes ST23. The rest is basically the same as FIG. 10, and thus the steps and sequences which are the same as those in FIG. 10 are denoted by the same step and reference numbers, and only a difference, if any, between the respective steps and sequence numbers are described herein.

First, in FIG. 25, the DTE 1 carries out selection condition setting request processing according to the user's operation (step ST21). More specifically, as shown in FIG. 27a, the DTE 1 displays a selection condition input form $IF_{SC}$. The user operates the DTE 1 so as to input several keywords $W_{KEY}$ into the selection condition input form $IF_{SC}$. Here, the keywords $W_{KEY}$ are the ones which are used to define the content data CD by attribute. For example, if the user wants to see food advertisements carrying the lowest price, the user inputs the corresponding keywords $W_{KEY}$ into the selection condition input form $IF_{FS}$ to define what he/she wants. In response, the DTE 1 generates a selection condition setting request $RS_{SCS}$, which is a signal requesting the DCE3 to set a selection condition(s) SC therein to forward only content data CDs matching the user's preferences. The signal includes at least the identifier $ID_{SCS}$ and the inputted keywords $W_{KEY}$, and the identifier $ID_{SCS}$ therein specifies the signal as being a selection condition setting request $RD_{SCS}$. With the signal, the DCE 3 can grasp the user's preferences for the content data CDs.

Figure 28:
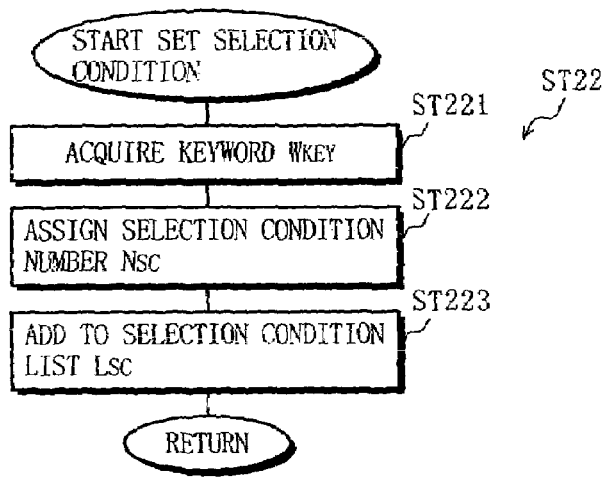
FIG. 28 is a flowchart showing step ST22 of FIG. 25 in more detail for its processing procedure.

Such a selection condition setting request $RS_{SCS}$ is converted into a format which is suitable for the transmission path 2 by the DTE 1, sent out onto the transmission path 2, and received by the user interface 32 of the DCE 3 (see FIG. 2) (sequence SQ21). Then, in the user interface 32, the selection condition setting request $RS_{SCS}$ is reconverted before being received by the processing unit 31. The processing unit 31 then checks the identifier $ID_{SCS}$ in the received signal to determine if the signal is a selection condition setting request $RS_{SCS}$. If the signal is a selection condition setting request $RS_{SCS}$, the processing unit 31 carries out the selection condition setting request processing (step ST22). FIG. 28 shows the detailed processing procedure of step ST22. In FIG. 28, the processing unit 31 extracts the keywords $W_{KEY}$ from the received selection condition setting request $RS_{SCS}$ (step ST221). Then, the processing unit 31 assigns a unique selection condition number $N_{SC}$ to a selection condition SC which is structured by the retrieved keywords $W_{KEY}$ (step ST222). The processing unit 31 then accesses the selection condition list storage 36, and adds the current set of the selection condition number $N_{SC}$ and the selection condition SC in a selection condition list $L_{SC}$ such as the one shown in FIG. 27b (step ST223). In such a form of the selection condition list $L_{SC}$, the user designated selection condition(s) SC are set to the DCE 3.

After the selection condition setting is completed, the same communications and processing are carried out in the data transmission system as in the first embodiment; that is, steps ST1 to ST10, and sequences SQ1 to SQ7 (see FIGS. 9 and 10). Note that although the processing was performed on the content data CD basis in steps ST1 to ST10 in the first embodiment, the processing in the second embodiment is on the content data set CDS basis. In brief, the DTE 1 transmits a content reservation request $RS_{TR}$ to the server 6 to request for the transmission of a content data set CDS. In response, with respect to the requested content data set CDS, the server 6 carries out processing including scheduling, data transmission, charging, and the like. As a result, as compared with the transmission data TD of FIG. 13g, the transmission data TD that is transmitted in sequence SQ7 herein includes the identifier $ID_{CDS}$ and the content data set CDS instead of the identifier $ID_{CD}$ and the content data CD.

Figure 29:
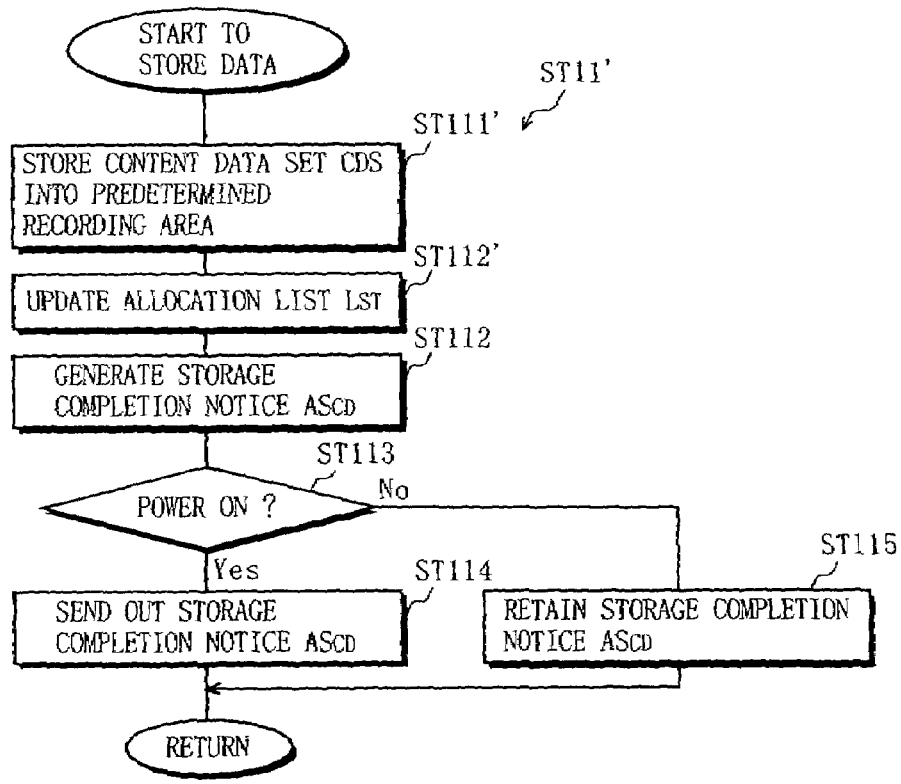
FIG. 29 is a flowchart showing step ST11' of FIG. 26 in more detail for its processing procedure.

As in the first embodiment, the transmission data TD is sent out onto an optimal communications circuit (the first or the second communications circuit 4 or 5). Herein, the optimal communications circuit is presumed to be the first communications circuit 4. The transmission data TD on the first communications circuit 4 is received by the circuit interface 33 of the DCE 3 via several exchange systems 41, and is then forwarded to the processing unit 31. Upon reception of the transmission data TD, the processing unit 31 carries out data storage processing (step ST11'). FIG. 29 shows the detailed processing procedure of step ST11'. As compared with FIG. 22, step ST111 is replaced by steps ST111' and ST112' in FIG. 29. Other steps which are identical to those that are illustrated in FIG. 22 are denoted by the same step numbers, and are not described again. In FIG. 29, out of the received transmission data TD, the processing unit 31 stores at least the content data set CDS into a predetermined recording area of the content storage 35 (step ST111'). Here, the predetermined recording area is the one which is reserved in step ST5.

Figure 30:
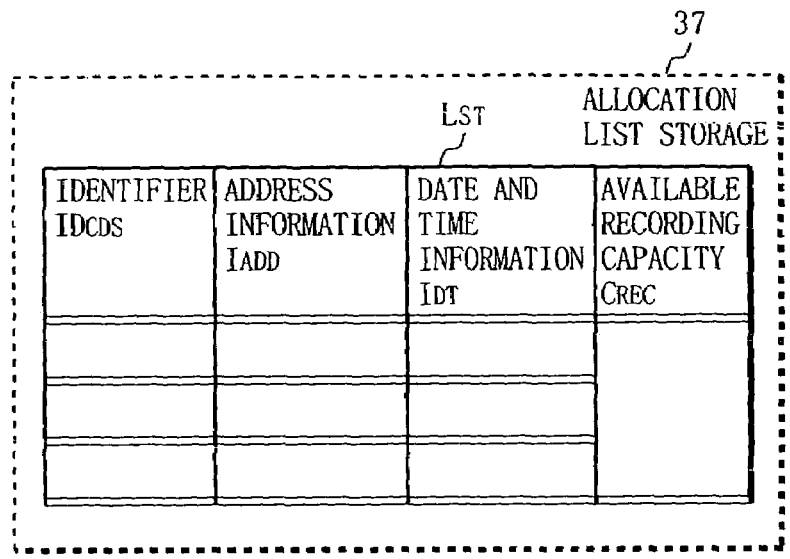
FIG. 30 is a diagram showing an allocation list $L_{ST}$ which is stored in an allocation list storage 37 of FIG. 24.

Next, the processing unit 31 carries out update processing on the allocation list $L_{ST}$ (step ST112'). More specifically, as for every content data CD that is currently stored in the content storage 35, the processing unit 31 adds, to an allocation list $L_{ST}$ such as the one shown in FIG. 30, an identifier $ID_{CDS}$ of the content data set CDS, address information $I_{ADD}$ specifying the location of the content data CD in the recording area, and date and time information $I_{DT}$ indicating when the content data CD was stored (i.e., the current date and time). The allocation list $L_{ST}$ also has a section for a recording capacity $C_{REC}$, which indicates a current available capacity of the recording area of the content storage 35. Thus, with the content data set CDS stored in the content data storage 35 in step ST111', the processing unit 31 writes the resultant value into the recording capacity $C_{REC}$. After step ST112' is completed, the procedure goes to steps ST112 and onwards, and the processing unit 31 transmits a storage completion notice $AS_{CD}$ to the DTE 1 (sequence SQ8).

Figure 31:
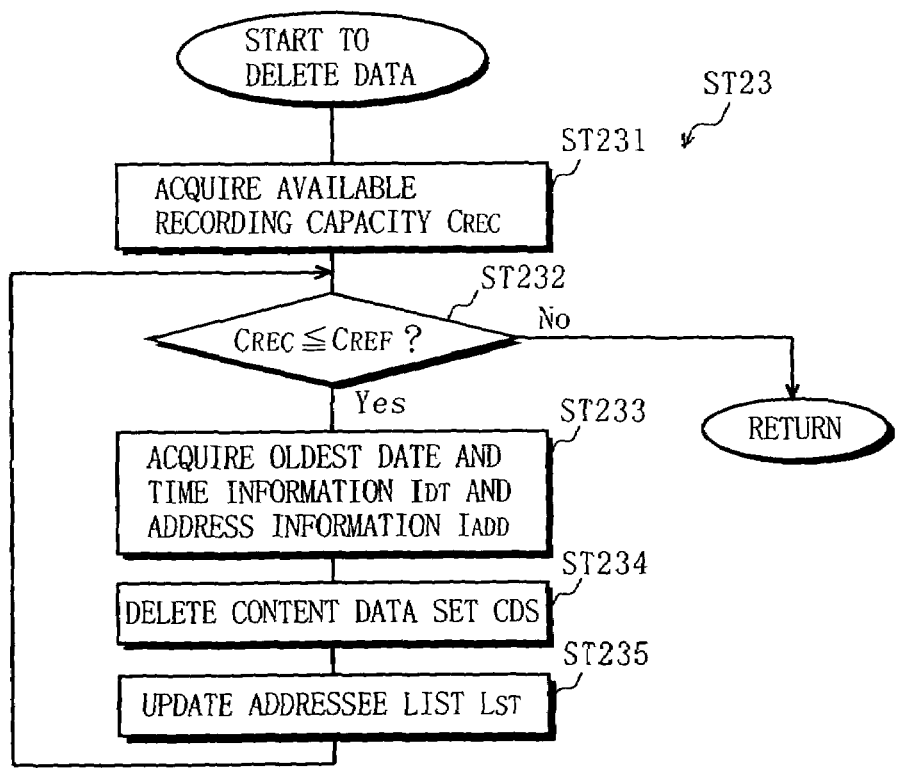
FIG. 31 is a flowchart showing step ST23 of FIG. 26 in more detail for its processing procedure.

After step ST12 is completed, the storage capacity $C_{REC}$ of the content storage 35 is decreased in value. Thus, the processing unit 31 carries out data deletion processing (step ST23) Step ST23 corresponds to a data deletion part herein, and FIG. 31 shows the detailed processing procedure thereof. In FIG. 31, the processing unit 31 extracts the current recording capacity $C_{REC}$ from the allocation list $L_{ST}$ (step ST231), and then measures its level by comparing the current recording capacity $C_{REC}$ with a reference recording capacity $C_{REF}$ (step ST232).

If the reference recording capacity $C_{REF}$ is not less than the current recording capacity $C_{REC}$, the processing unit 31 determines that the recording area of the content storage 35 is still sufficiently available for recording a new content data CD, and step ST23 is now completed. On the other hand, if the current recording capacity $C_{REC}$ is not more than the reference recording capacity $C_{REF}$, the processing unit 31 determines that the recording area of the content storage 35 is running out, and thus the procedure goes to step ST233. Then, the processing unit 31 searches the allocation list $L_{ST}$ for the oldest date and time information $L_{DT}$, and extracts the address information $I_{ADD}$ corresponding thereto (step ST233).

The processing unit 31 then deletes (erases), from the recording area that is specified by the retrieved address information $I_{ADD}$, the content data set CDS (step ST234). The processing unit 31 also updates the allocation list $L_{ST}$ (stepST235). In more detail, the processing unit 31 deletes, from the allocation list $L_{ST}$, the date and time information $I_{DT}$ and the address information $I_{ADD}$ that are acquired in step ST233, and the identifier $ID_{CDS}$ corresponding thereto. Then, the processing unit 31 updates the recording capacity $C_{REC}$ in the allocation list $L_{ST}$ to a value reflecting the deletion of the content data set CDS. After step ST235 is completed, the procedure returns to step ST231 and repeats steps ST231 to ST235 until the recording capacity $C_{REC}$ exceeds the reference recording capacity $C_{REF}$. In this manner, the recording area of the content storage 35 can be always available for data which is at least in size represented by the reference recording capacity $C_{REF}$.

With the storage completion notice $AS_{CD}$ that is received by the DTE 1, the procedure goes to step ST12. From now on, it is up to the user to decide when to operate the DTE 1 so as to read the content data CDS from the DCE 3. When the DTE 1 is operated, the DTE 1 generates a read request $RS_{RO}$ (step ST13). In the second embodiment, the read request $RS_{RO}$ is a signal for requesting the DCE 3 to read the content data CDS at the user's request from the content storage 35.

Figure 32:
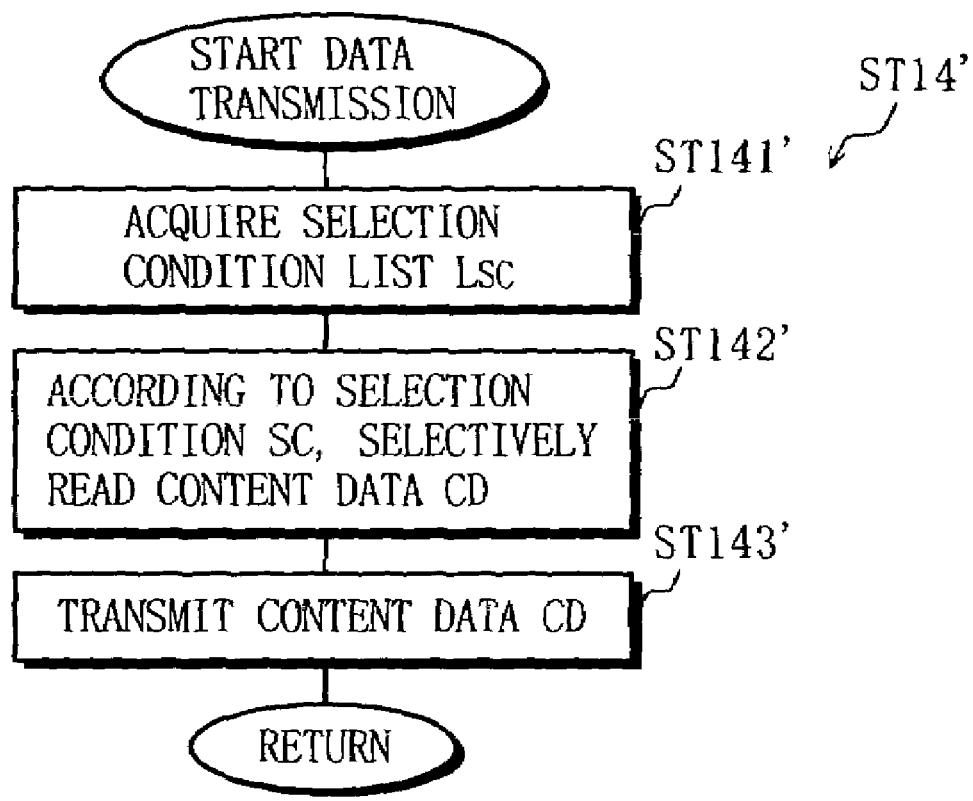
FIG. 32 is a flowchart showing step ST14' of FIG. 26 in more detail for its processing procedure.

The read request $RS_{RO}$ is transmitted from the DTE 1 to the DCE 3 (sequence SQ9). In response to the read request $RS_{RO}$ the processing unit 31 of the DCE 3 carries out the data transmission processing of step ST14'. Step ST14' corresponds to a data transmission part herein, and FIG. 32 shows the detailed processing thereof. First, the processing unit 31 extracts every selection condition SC that is found in the selection condition list $L_{SC}$ (see FIG. 27b) (step ST141'). Then, the processing unit 31 accesses the content storage 35 so as to selectively read any content data CD satisfying the retrieved selection conditions SC from the user designated content data set CDS (step ST142'). The processing unit 31 then transmits the read content data CD(s) to the DTE 1 via the user interface 32 and the transmission path 2 (step ST143'). The DTE 1 then carries out output processing on the received content data CD(s) (step ST15), and the user can accordingly see what the content data CD(s) carry.

Figure 33:
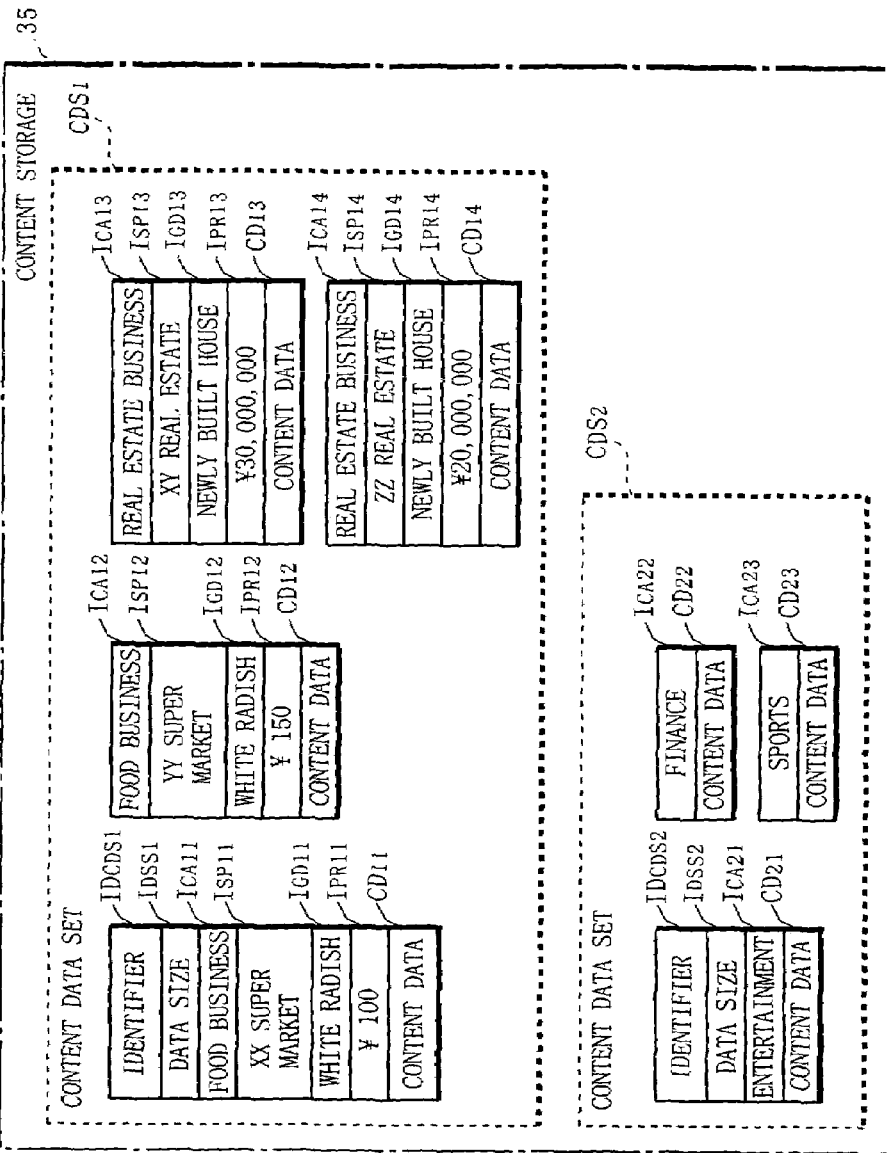
FIG. 33 is a diagram showing a specific example of a content data set which is stored in a content storage 35 of FIG. 24.

Therefore, in the second embodiment, the user sets, to the DCE 3, a selection condition SC such as the one shown in FIG. 27a to define what content data CD he/she wants. Assume here that five selection conditions SC as shown in FIG. 27b are set to the DCE 3. In response to the content reservation request $RS_{TR}$, the server 6 transmits a content data set CDS at the user's request to the DCE 3 with a timing that is determined through scheduling, and the DCE 3 stores the received content data that is set in the content storage 35. Here, transmitted from the server 6 are presumably the content data sets $CDS_1$ and $DCS_2$ of FIG. 33, each of which carries a plurality of content data CDs. Specifically, as shown in FIG. 33, the content data set $CDS_1$ includes an identifier $ID_{CDS1}$, a data size $I_{DSS1}$, and four content data CDs $CD_{11}$, to $CD_{14}$. The content data $CD_{11}$, carries category information $I_{CA11}$ indicating as a food business, name information $I_{SP11}$ as XX supermarket, product information $I_{GD11}$ as a white radish, and price information $I_{PR11}$ as ¥100. Similar to other content data $CD_{12}$ to $CD_{14}$, attribute information $I_{AT12}$ to $I_{AT14}$ (category information $I_{CA12}$ to $I_{CA14}$, name information $I_{SP12}$ to $I_{SP14}$, product information $I_{GD12}$ to $I_{GD14}$, and price information $I_{PR12}$ to $I_{PR14}$) are provided, respectively. The content data set $CDS_2$ includes an identifier $ID_{CDS2}$, a data size $I_{DSS2}$, and three content data $CD_{21}$ to $CD_{23}$. Here, provided to the content data $CD_{21}$ is category information $I_{CA21}$ as entertainment, while provided to the content data $CD_{22}$ and $CD_{23}$ are category information $I_{CA22}$ and $I_{CA23}$ as finance and sports, respectively.

Figure 34:
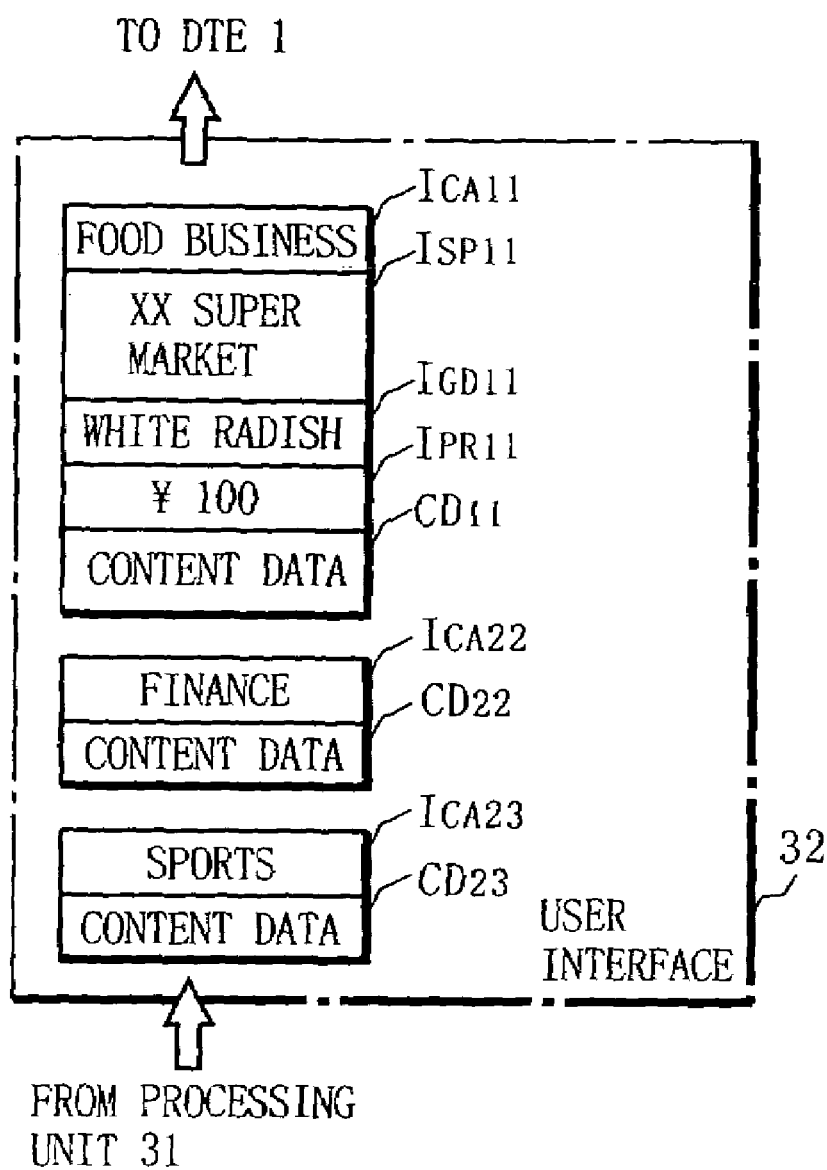
FIG. 34 is a diagram showing a specific example of a content data CD that is sent out from a user interface 32 of FIG. 24.

In such a case, after the processing unit 31 carries out the data transmission processing (step ST14') according to the selection conditions SC (see FIG. 27b), the content data $CD_{11}$, $CD_{22}$, and $CD_{23}$ are selected and transmitted to the DTE 1 via the user interface 32. In the example of FIG. 34, although every information accompanying the $CD_{11}$, $CD_{22}$, and $CD_{23}$ is transmitted, essentially, only the $CD_{11}$, $CD_{22}$, and $CD_{23}$ will do. In such a data transmission system according to the second embodiment, since the user sets his/her selection conditions SC to the DCE 3, the user can receive only content data CD of interest.

Here, in the second embodiment, the content data $CD_{11}$ to $CD_{1p}$ are presumably all advertisements, and are accompanied by attribute information $I_{AT11}$ to $I_{AT1p}$ corresponding thereto. However, since the attribute (product price and the number of stocks) and details of the advertisement are changeable, some content data $CD_1$ and/or some attribute information $I_{AT1}$ may be already out of date at about the time when the content data set $CDS_1$ reaches the DCE 3. To deal with this situation, the server 6 generates an information change request to be transmitted to the DCE 3. Here, the information change request is a signal to request the DCE 3 to update the content data $CD_1$ and/or the attribute information to be the latest information, and the information change request includes the identifier $ID_{CD1}$, the content data $CD_1$ in the latest version, and/or the attribute information $I_{AT1}$. In response to such an information change request, the DCE 3 uses the identifier $ID_{CD1}$ therein to specify the recording area where the content data $CD_1$ and/or the attribute information IAT1 is stored, deletes the content data $CD_1$ and/or the attribute $I_{AT1}$ from the specified recording area, and then stores the content data $CD_1$ in the latest version and/or the attribute information $I_{AT1}$ in the content storage 35. With such processing, without transmitting the content data set $CDS_1$ in its entirety, the content data $CD_1$ and/or attribute information $I_{AT1}$ can be accordingly changed whenever a change is needed. In this sense, the transmission bandwidth of the first and second communications circuits 4 and 5 can be effectively utilized. Note that a transmission timing of such an information change request is preferably determined in scheduling. It is preferable that the information change request reaches the DCE 3 sooner.

Also in the second embodiment, the DTE 1 first transmits a content reservation request $RS_{TR}$ to the server 6 so as to acquire the content data set $CDS_2$ including various news. The content data set $CDS_2$, however, may be transmitted to the DTE 1 due to push technology in some cases. To be more specific, the user of the DTE 1 sign-ups a distribution service of the content data set $CDS_2$ that is offered by the provider thereof (e.g., newspaper publishing company). In such a case, a server on the provider side requests for the server 6 to transmit the content data set $CDS_2$ to the DCE 3 corresponding to the requesting user. At this time, the server on the provider side notifies the server 6 of the user's identifier $ID_{USER}$, the time limit LT, and the content data set $CDS_2$. In response to this notification, the server 6 generates transmission data TD by using the notified information.

Also in the second embodiment, the out-of-date content data set CDS is deleted when the recording capacity $C_{REC}$ of the content storage 35 is running short (see step ST23). This is not restrictive, and the out-of-date content data set CDS may be deleted when an expiration date previously provided thereto arrives. Alternatively, the out-of-date content data set CDS may be deleted with a lapse of a predetermined time that is measured from the time that the content data set CDS was generated. Here, information indicating the date and time when the advertisement is made is previously provided to the content data set CDS. Such information indicating the expiration date and the date and time corresponds to deletion timing information herein.

Also in the second embodiment, the DCE 3 is exemplified as reading any content data CD satisfying the selection conditions SC from the content storage 35 before transmitting the read content data CD to the DTE 1. This is not restrictive, and the processing unit 31 may select any content data CD satisfying the selection conditions SC when receiving the content data set CDS, and then store the content data CD(s) into the content storage 35. Further, the processing unit 31 discards any content data CD not satisfying the selection conditions SC. In this case, the processing unit 31 responds to the read request $RS_{RO}$ from the DTE 1, and reads the content data CD that is selected at reception from the content storage 35 for transmission to the DTE 1. In this manner, the user can acquire content data CD of interest only, and further, a efficient use of the recording area of the content storage 35 can be achieved since unwanted content data CD is not stored therein.

While the present invention has been described in detail, the foregoing description is in all aspects illustrative and not restrictive. It is to be understood that numerous other modifications and variations can be devised without departing from the scope of the present invention.

What is claimed is:

1. A data transmission system in which a server is operable to transmit content data that is designated by a content reservation request, which is issued by a data terminal device for the content data, said server being operable to transmit the content data through either one of a wired communication circuit and a wireless communication circuit to a data circuit terminating device which is connected to said data terminal device for storing the content data, said wireless communication circuit being operable to transmit data to a plurality of data circuit terminating devices by one transmission, wherein:

said server and said data circuit terminating device are connected by each of said wired communication circuit and said wireless communication circuit;

each of said wired communication circuit and said wireless communication circuit is operable to communicate the content data to said data terminal device;

each of said wired communication circuit and said wireless communication circuit is operable to provide communication between said server and said data terminal device through different means;

the content reservation request indicates a time limit in which the content data that is designated by said data terminal device is to be available in said data circuit terminating device;

either said server or any one of said wired communication circuit and said wireless communication circuit comprises:

a time limit management part operable to manage the time limit indicated by the content reservation request issued from said data terminal device; and a scheduling part, based on both the time limit managed in said time limit management part and whether or not a reference value associated with said wireless communication circuit indicating that said wireless communication circuit is suitable for communicating the content data is satisfied by a number, which is included in predetermined communications information, of data terminal devices to which the content data is addressed, operable to determine a transmission time and to select either one of said wired communication circuit and said wireless communication circuit which provides the most optimal means for communication between said server and said data circuit terminating device, so as to ensure that the content data is completely transmitted by the indicated time limit; and said server comprises a data send out part operable to send out the content data onto the determined optimal one of said wired communication circuit and said wireless communication circuit according to the transmission time that is determined by said scheduling part.

2. The data transmission system according to claim 1, wherein the predetermined communications information indicates at least one of a size of the content data that is designated by the content reservation request and the number of data terminal devices to which the content data is addressed.

3. The data transmission system according to claim 1, wherein said data circuit terminating device operates while receiving power from any one of said plurality of communications circuits.

4. The data transmission system according to claim 1, wherein said data circuit terminating device comprises:

a content storage operable to store the content data transmitted over the determined optimal one of said optimal communications circuits into a recording area thereof; and a data transmission part operable to read, from said content storage, the content data that is designated by a read request issued from said data terminal device for the content data to be transmitted to said data terminal device.

5. The data transmission system according to claim 4, wherein, after reading the content data that is designated by the read request, said data transmission part is also operable to read content data that is not designated by the read request, and to transmit a set of the read content data to the data terminal device.

6. The data transmission system according to claim 4, wherein said data circuit terminating device is operable to transmit a storage completion notice to said data terminal device indicating that the content data is successfully stored in the recording area of said content storage.

7. The data transmission system according to claim 6, wherein the storage completion notice is in a format of HTML.

8. The data transmission system according to claim 6, wherein the storage completion notice is an e-mail.

9. The data transmission system according to claim 6, wherein
said data circuit terminating device is operable to transmit the storage completion notice to said data terminal device in various formats, and
said data circuit terminating device is operable to transmit the storage completion notice to said data terminal device in a format that is designated by a user of said data terminal device.

10. The data transmission system according to claim 4, wherein
at least one of said plurality of communications circuits includes a recording area management unit operable to manage the recording area of said data circuit terminating device, and
in response to a request from said server, said recording area management unit is operable to transmit a recording area reserve instruction to request said data circuit terminating device to reserve a space in the recording area for the content data.

11. The data transmission system according to claim 4, wherein
said data circuit terminating device is operable to inquire said server through cache processing whether the content data has been updated when the content data that is requested by said data terminal device is popular,
said server is operable to, when the content data has been updated, responsively transmit the updated content data to said data circuit terminating device, and
said data circuit terminating device is operable to store the updated content data received from said server into said content storage.

12. The data transmission system according to claim 11, wherein
the recording area of said content storage is divided into a plurality of smaller areas, and
said data circuit terminating device is operable to assign each different smaller area to store the content data acquired by the content reservation request and the content data acquired through the cache processing.

13. The data transmission system according to claim 4, wherein
said system includes at least one additional data circuit terminating device, said data circuit terminating device and said at least one additional data circuit terminating device constituting a plurality of data circuit terminating devices, and
any one of said plurality of data circuit terminating devices is operable to acquire content data that is stored in a content storage area of another one of said plurality of data circuit terminating devices.

14. The data transmission system according to claim 1, wherein said data circuit terminating device is operable to, in the cache processing, inquire said server when the communications traffic on the determined optimal one of said plurality of communications circuits is low.

15. The data transmission system according to claim 1, wherein said data circuit terminating device is implemented with a protocol to function as a mail server, and is operable to perform transmission and reception of an e-mail.

16. The data transmission system according to claim 15, wherein said data circuit terminating device is operable to send out the e-mail onto the determined optimal one of said plurality of communications circuits when the communications traffic on the determined optimal one of said plurality of communications circuits is low.

17. The data transmission system according to claim 16, wherein
the e-mail is assigned a priority indicating an importance of the e-mail, and
said data circuit terminating device is operable to change a timing for sending out the e-mail onto the determined optimal one of said plurality of communications circuits according to the priority assigned to the e-mail.

18. A data transmission method in which a server transmits content data that is designated by a content reservation requests, which is issued by a data terminal device for the content data, the content data being transmitted by the server through either one of a wired communication circuit and a wireless communication circuit to a data circuit terminating device which is connected to the data terminal device for storing the content data, and the wireless communication circuit being operable to transmit data to a plurality of data circuit terminating devices by one transmission, wherein:
the server and the data circuit terminating device are connected by each of the wired communication circuit and the wireless communication circuit;
communication of the content data to the data terminal device can be performed by each of the wired communication circuit and the wireless communication circuit;
communication between the server and the data terminal device is provided by each of the wired communication circuit and the wireless communication circuit through different means;
the content reservation request indicates a time limit in which the content data that is designated by the data terminal device is to be available in the data circuit terminating device;
wherein, in either the server or any one of the wired communication circuit and the wireless communication circuit, said method comprises:
managing the time limit indicated by the content reservation request issued from the data terminal device; and
determining, based on both the time limit managed in said managing of the time limit and whether or not a reference value associated with the wireless communication circuit indicating that the wireless communication circuit is suitable for communicating the content data is satisfied by a number, which is included in predetermined communications information, of data terminal devices to which the content data is addressed, a transmission time and selecting one of the wired communication circuit and the wireless communication circuit which provides the most optimal means for communication between the server and the data circuit terminating device so as to ensure that the content data is completely transmitted by the indicated time limit; and
wherein, in the server, said method comprises sending out the content data onto the selected optimal one of the wired communication circuit and the wireless communication circuit circuits according to the transmission time determined in said determining of the transmission time.

19. A data transmission system comprising a plurality of data terminal devices in which content data that is designated by a content reservation request issued from any number of said plurality of data terminal devices is transmitted from a server to said plurality of data terminal devices through either one of a wired communication circuit and a wireless communication circuit,
   wherein said wireless communication circuit is operable to transmit data to said plurality of data terminal devices by one transmission,
   wherein said server and said plurality of data terminal devices are connected by each of said wired communication circuit and said wireless communication circuit;
   wherein the content reservation request indicates a download condition for downloading the content data that is designated by one of said plurality of data terminal devices;
   wherein said data transmission system comprises:
      a status data generation part operable to generate content reservation status data listing at least one download condition which is indicative of at least one of a transmission time and a transmission cost for content data that is available to be transmitted from said server; and
      a data transmission part operable to transmit the content reservation status data generated by said status data generation part to the number of said plurality of data terminal devices;
   wherein said data transmission system is operable to collect from the number of said plurality of data terminal devices a corresponding number of content reservation requests each indicating a download condition for downloading the content data to the number of said plurality of data terminal devices, respectively;
   wherein said data transmission system further comprises:
      a download condition management part operable to manage the content data and the at least one download condition in accordance with the number of content reservation requests received from the number of said plurality of data terminal devices;
      a scheduling part, based on both the at least one download condition managed in said download condition management part and whether or not a reference value associated with said wireless communication circuit indicating that said wireless communication circuit is suitable for communicating the content data is satisfied by a number, which is included in predetermined communications information, of said plurality of data terminal devices to which the content data is addressed, operable to determine a transmission timing and select either one of said wired communication circuit and said wireless communication circuit which ensures that the content data transmitted under the download condition is completely received by the number of said plurality of data terminal devices in accordance with the download condition indicated by the content reservation request received from each of the number of said plurality of data terminal devices, and
      a data send out part operable to send out the content data onto the selected one of said wired communication circuit and said wireless communication circuit according to the transmission timing determined by said scheduling part.

20. The data transmission system according to claim 19, wherein the download condition is a time limit in which the content data that is designated by at least one of said plurality of data terminal devices is to be ready in any one of said data terminal devices.

21. The data transmission system according to claim 20, further comprising an acceptance processing part operable to accept the content reservation request and to determine, based on how many other data terminal devices of said plurality of data terminal devices are induced to receive the content data by the time limit, a transmission expense for the content data.

22. The data transmission system according to claim 21, wherein, said acceptance processing part is operable to refer to a time margin that is left for a new time limit to determine the transmission expense for the content data when the content reservation request that is issued from one of said plurality of data terminal devices carries the new time limit which is not indicated by the content reservation status data.

23. The data transmission system according to claim 19, wherein
   the download condition is a transmission expense for the content data that is designated by the content reservation request issued from one of said plurality of data terminal devices,
   said transmission system further comprises an acceptance processing part operable to accept the content reservation request from the one of said plurality of data terminal devices, and to determine, based on how many other data terminal devices of said plurality of data terminal devices are requesting for the content data to be transmitted by the time limit, the transmission expense for the content data, and
   said data send out part is operable to send out the content data designated by the content reservation request onto one of said wired communication circuit and said wireless communication circuit when the transmission expense determined by said acceptance processing part becomes equal to or less than a predetermined value.

24. The data transmission system according to claim 19, wherein
   the download condition is the number of other data terminal devices of said plurality of data terminal devices requesting for the content data to be transmitted,
   said data transmission system further comprises an acceptance processing part operable to accept the content reservation request from one of said plurality of data terminal devices, and to determine, based on how many other data terminal devices of said plurality of data terminal devices are requesting the content data to be transmitted, a transmission expense for the content data, and
   said data send out part is operable to send out the content data designated by the content reservation request onto one of said wired communication circuit and said wireless communication circuit when the number of content reservation requests that are accepted by said acceptance processing part becomes equal to or larger than a predetermined value.

25. A data transmission method in which content data that is designated by a content reservation request issued from any number of a plurality of data terminal devices is transmitted from a server to the plurality of data terminal devices through either one of a wired communication circuit and a wireless communication circuit, wherein the server and the plurality of data terminal devices are connected by each of the wired communication circuit and the wireless communication circuit, which is operable to transmit data to the plurality of data terminal devices by one transmission, wherein the content reservation request indicates a download condition which is indicative of at least one of a transmission time and a transmission cost for downloading the content data that is designated by the plurality of data terminal devices;

wherein said method comprises:

generating content reservation status data listing at least one download condition for content data that is available for transmission; and transmitting the content reservation status data generated in said generating of the content reservation status data to the number of the plurality of data terminal devices; and wherein said method further comprises:

collecting from the number of the plurality of data terminal devices a corresponding number of content reservation requests each indicating a download condition for downloading the content data to the plurality of data terminal devices, respectively;

managing the content data and the at least one download condition in accordance with the number of content reservation requests received from the number of the plurality of data terminal devices;

determining, based on both the at least one download condition managed in said managing of the at least one download condition and whether or not a reference value associated with the wireless communication circuit indicating that the wireless communication circuit is suitable for communicating the content data is satisfied by a number, which is included in predetermined communications information, of the plurality of data terminal devices to which the content data is addressed, a transmission timing and selecting either one of the wired communication circuit and the wireless communication circuit which ensures that the content data transmitted under the at least one download condition is completely received by the number of the plurality of data terminal devices in accordance with the download condition indicated by the content reservation request received from each of the number of data terminal devices; and sending out the content data onto the selected one of the wired communication circuit and the wireless communication circuit according to the transmission timing determined in said determining of the transmission timing.

26. A data transmission system in which a server is operable to transmit a content data set that is designated by a content reservation request, which is issued by a data terminal device for the content data set, said server being operable to transmit the content data set through either one of a wired communication circuit and a wireless communication circuit to a data circuit terminating device which is connected to said data terminal device for storing the content data set, wherein:

said wireless communication circuit is operable to transmit data to a plurality of data circuit terminating devices by one transmission;

said server and said data circuit terminating device are connected by each of said wireless communication circuit and said wireless communication circuit;

each of said wired communication circuit and said wireless communication circuit is operable to communicate the content data to said data terminal device;

each of said wired communication circuit and said wireless communication circuit is operable to provide communication between said server and said data terminal device tough different means;

the content data set includes a plurality of content data each varying in content;

the content reservation request indicates a time limit in which the content data set that is designated by said data terminal device is to be available in said data circuit terminating device;

either said server or any one of said wired communication circuit and said wireless communication circuit comprises:

a time limit management part operable to manage the time limit indicated by the content reservation request issued from said data terminal device; and a scheduling part, based on both the time limit managed in said time limit management part and whether or not a reference value associated with said wireless communication circuit indicating that said wireless communication circuit is suitable for communicating the content data is satisfied by a number, which is included in predetermined communications information, of data terminal devices to which the content data is addressed, operable to determine a transmission time and to select either one of said wired communication circuit and said wireless communication circuit which provides the most optimal means for communication between said server and said data circuit terminating device so as to ensure that the content data set is completely transmitted by the indicated time limit;

said server comprises a data send out part operable to send out the content data set onto the selected one of said wired communication circuit and said wireless communication circuit according to the transmission time determined by said scheduling part; and said data circuit terminating device is connected to each of said wired communication circuit and said wireless communication circuit, and said data circuit terminating device is operable to receive the content data set from the selected optimal one of said wired communication circuit and said wireless communication circuit and to read only the content data satisfying a predetermined selection condition for the content data to be transmitted to said data terminal device.

27. The data transmission system according to claim 26, wherein said data circuit terminating device comprises:

a content storage operable to store the content data set received from the selected optimal one of said wired communication circuit and said wireless communication circuit therein; and a data transmission part operable to read, from said content storage, only the content data satisfying the predetermined selection condition for the content data to be transmitted to said data terminal device in response to a read request issued from said data terminal device for the content data.

28. The data transmission system according to claim 27, wherein
each of the content data that is included in the content data set is provided with attribute information indicating a respective attribute thereof,
said data circuit terminating device further comprises a selection condition list storage operable to store a selection condition list including a selection condition based on the attribute of the content data to be transmitted to said data terminal device, and
said data transmission part is operable to read, from said content storage, the content data according to the selection condition list stored in said selection condition list storage for transmission of the content data to said data terminal device.

29. The data transmission system according to claim 28, wherein the selection condition list is generated based on a keyword that is inputted into said data terminal device by a user.

30. The data transmission system according to claim 27, wherein said data circuit terminating device further comprises a data deletion part operable to delete the content data set stored in said content storage within a predetermined timing.

31. The data transmission system according to claim 8, wherein said data deletion part is operable to delete the content data set stored in said content storage when a recording capacity of said content storage becomes smaller than a predetermined reference recording capacity.

32. The data transmission system according to claim 8, wherein
the content data set is provided with deletion timing information indicating a timing when the content data set is to be deleted, and
said data deletion part is operable to delete the content data set according to the deletion timing information provided with the content data set.

33. The data transmission system according to claim 26, wherein said data circuit terminating device comprises:
a content storage operable to store, from the content data set received from the determined optimal one of said wired communication circuit and said wireless communication circuit, only the content data satisfying the predetermined selection condition, and
a data transmission part operable to read the content data stored in said content storage for the content data to be transmitted to said data terminal device in response to a read request issued firm said data terminal device for the content data.

34. A data transmission method in which a server transmits a content data set that is designated by a content reservation request which is issued from a data terminal device for the content data set, the content data set being transmitted by the server through either one of wired communication circuit and a wireless communication circuit to a data circuit terminating device which is connected to the data terminal device for storing the content data set, wherein:

the server and the data circuit terminating device are connected by each of the wired communication circuit and the wireless communication circuit, which is operable to transmit data to a plurality of data circuit terminating devices by one transmission;
communication of the content data to the data terminal device can be performed by each of the wired communication circuit and the wireless communication circuit;
communication between the server and the data terminal device is provided by each of the wired communication circuit and the wireless communication circuit through different means;
the content data set includes a plurality of content data each varying in content;
the content reservation request indicates a time limit in which the content data set that is designated by the data terminal device is to be available in the data circuit terminating device;
wherein, in either the server or any one of the wired communication circuit and the wireless communication circuit, said method comprises:
managing the time limit indicated by the content reservation request issued from the data terminal device; and
determining, based on both the time limit managed in said managing of the time limit and whether or not a reference value associated with the wireless communication circuit indicating that the wireless communication circuit is suitable for communicating the content data is satisfied by a number, which is included in predetermined communications information, of data terminal devices to which the content data is addressed, a transmission time and selecting one of the wired communication circuit and the wireless communication circuit which provides the most optimal means for communication between the server and the data circuit terminating device so as to ensure that the content data set is completely transmitted by the indicated time limit;
wherein, in the server, said method further comprises sending out the content data set onto the selected optimal one of the wired communication circuit and the wireless communication circuit according to the transmission timing determined in said determining of the transmission time;
wherein the data circuit terminating device is connected to each of the plurality of communications circuits; and
wherein, in the data circuit terminating device, said method further comprises reading, from the content data set received from the selected optimal one of the wired communication circuit and the wireless communication circuit, only the content data which has been predetermined to be transmitted to the data terminal device.

* * * * *

UNITED STATES PATENT AND TRADEMARK OFFICE
CERTIFICATE OF CORRECTION

PATENT NO.        : 7,093,026 B2
APPLICATION NO. : 09/781153
DATED              : August 15, 2006
INVENTOR(S)       : Takeshi Kokado et al.

It is certified that error appears in the above-identified patent and that said Letters Patent is hereby corrected as shown below:

Claim 21
In column 34, line 11, please add --,-- after "request" and before ""and".

Claim 31
In column 37, line 25, please replace "claim 8" with --claim 30--.

Claim 32
In column 37, line 30, please replace "claim 8" with --claim 30--

Claim 33
In column 37, line 48, please replace "firm" with --from-- after "issued" and before "said".

Claim 34
In column 37, line 52, please add --,-- after "request" and before "which".

Signed and Sealed this

Twenty-sixth Day of December, 2006

JON W. DUDAS
*Director of the United States Patent and Trademark Office*